(12) United States Patent
Joergensen et al.

(10) Patent No.: US 8,827,064 B2
(45) Date of Patent: Sep. 9, 2014

(54) METHOD OF OPERATING A FLOW LINE, AN ASSEMBLY TRAILER, A TOW BAR, A HEAVY MACHINE INSTALLED ON AN ASSEMBLY TRAILER AND A FLOW LINE

(75) Inventors: Rene Kroell Prammann Joergensen, Brande (DK); Klaus Dietrich, Leonberg-Warmbronn (DE)

(73) Assignee: Siemens Aktiengesellschaft, Munich (DE)

( * ) Notice: Subject to any disclaimer, the term of this patent is extended or adjusted under 35 U.S.C. 154(b) by 166 days.

(21) Appl. No.: 13/503,941

(22) PCT Filed: Aug. 6, 2010

(86) PCT No.: PCT/EP2010/061486
§ 371 (c)(1),
(2), (4) Date: Apr. 25, 2012

(87) PCT Pub. No.: WO2011/051003
PCT Pub. Date: May 5, 2011

(65) Prior Publication Data
US 2012/0217128 A1     Aug. 30, 2012

(30) Foreign Application Priority Data
Oct. 30, 2009  (EP) .................................... 09013689

(51) Int. Cl.
*B65G 43/08*   (2006.01)
*B23P 21/00*   (2006.01)

(52) U.S. Cl.
CPC .................................... *B23P 21/004* (2013.01)
USPC .................. 198/346.2; 198/465.2; 29/430

(58) Field of Classification Search
CPC .... B23Q 39/00; B23Q 2005/00; B65G 17/20; B65G 2047/00; B32P 21/00; B32P 21/004; B32P 19/001; B32P 19/04; B61B 10/00
USPC ..................... 198/346.1, 346.2, 465.1, 465.2; 104/165, 172.3; 29/429, 430, 783
See application file for complete search history.

(56) References Cited

U.S. PATENT DOCUMENTS

| | | | |
|---|---|---|---|
| 4,018,180 A | 4/1977 | Yoshida | |
| 6,226,848 B1 | 5/2001 | Kurtz | |
| 7,478,470 B2 * | 1/2009 | Mogck et al. | 29/564.1 |
| 7,608,801 B2 * | 10/2009 | Inoue et al. | 219/158 |
| 2001/0015003 A1 * | 8/2001 | Kurtz | 29/430 |
| 2003/0101579 A1 | 6/2003 | Kobayashi et al. | |
| 2008/0000068 A1 * | 1/2008 | Savoy et al. | 29/429 |

FOREIGN PATENT DOCUMENTS

| | | |
|---|---|---|
| CN | 1705583 A | 12/2005 |
| CN | 1756686 A | 4/2006 |
| JP | 2002219901 A | 8/2002 |

(Continued)

*Primary Examiner* — James R Bidwell

(57) ABSTRACT

A technique of operating a flow line is provided. The flow line includes two or more assembly stations for the assembly of a heavy machine. The technique involves installing a prepared assembly trailer in the flow line before or at a first assembly station. The prepared assembly trailer is connected to at least one flow line tow bar. If the prepared assembly trailer is installed before the first assembly station, then the assembly trailer is moved to the first assembly station. If not, all the flow line assembly trailers are moved to the next assembly station. The steps of moving the flow line assembly trailers are performed timewise stepwise.

11 Claims, 21 Drawing Sheets

(56) References Cited

FOREIGN PATENT DOCUMENTS

| JP | 2003170890 A | 6/2003 |
| JP | 2006001532 A | 1/2006 |
| JP | 2006526097 A | 11/2006 |
| JP | 2008094628 A | 4/2008 |

* cited by examiner

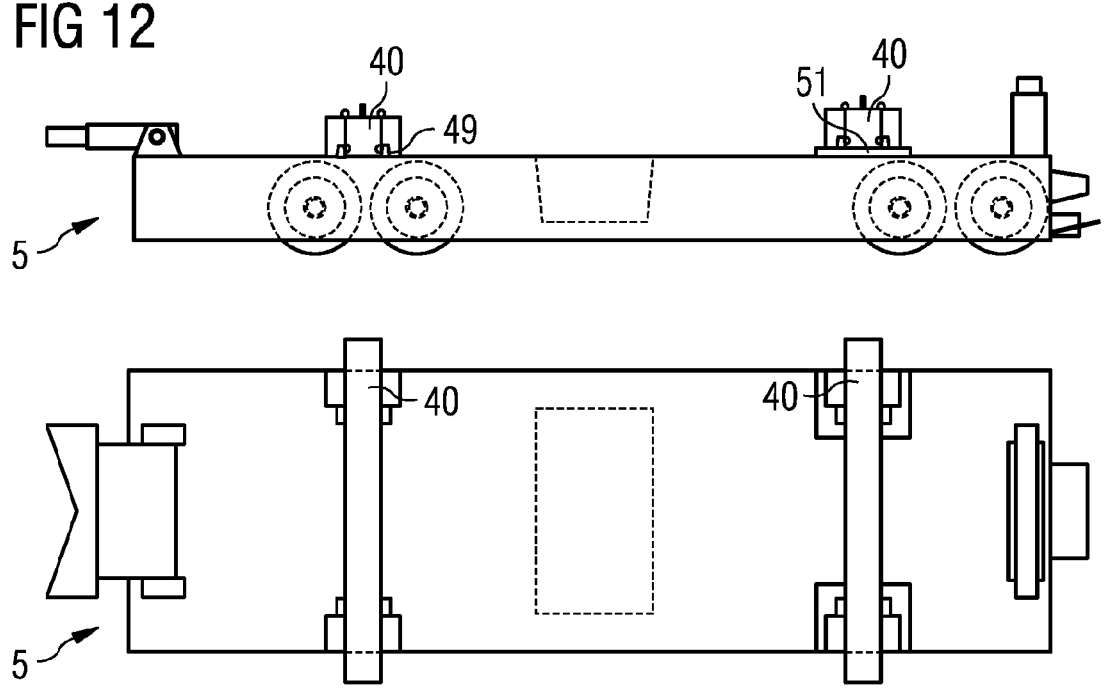
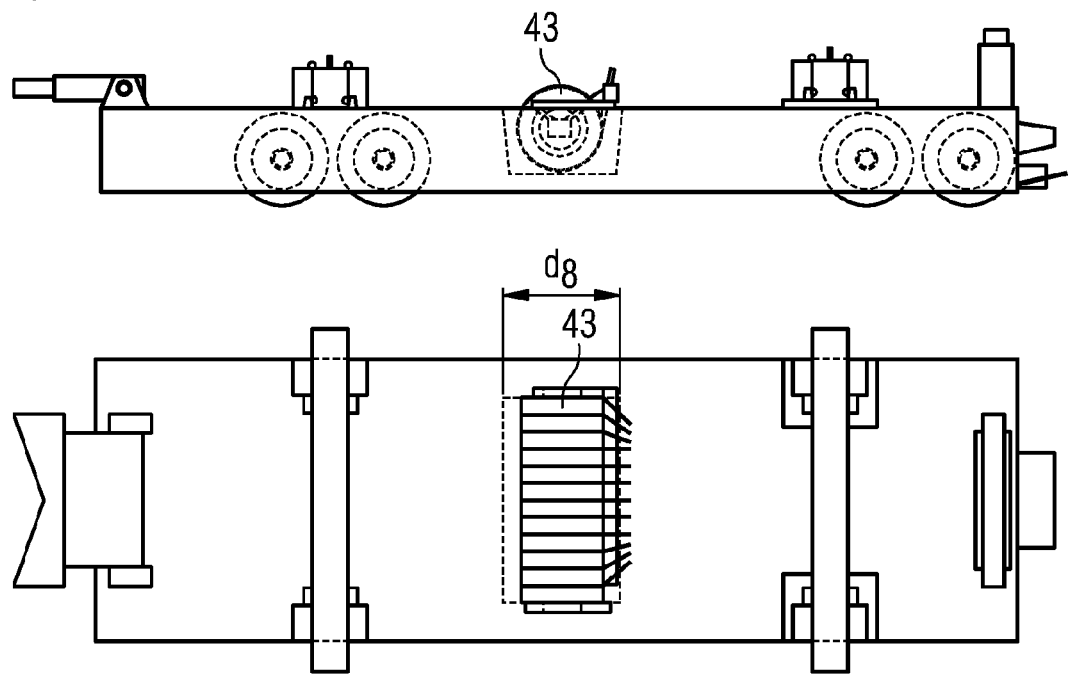

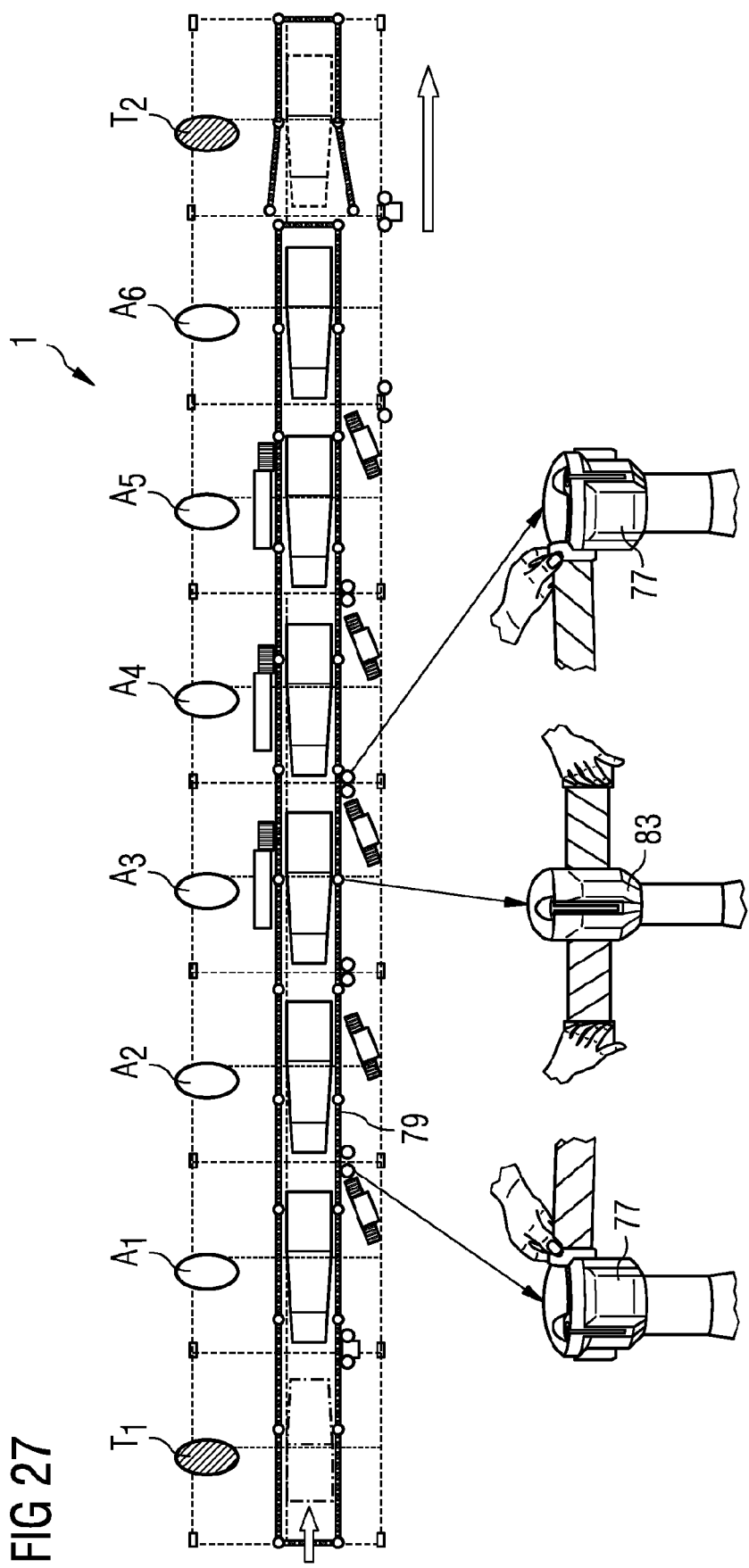

METHOD OF OPERATING A FLOW LINE, AN ASSEMBLY TRAILER, A TOW BAR, A HEAVY MACHINE INSTALLED ON AN ASSEMBLY TRAILER AND A FLOW LINE

CROSS REFERENCE TO RELATED APPLICATIONS

This application is the U.S. National Stage of International Application No. PCT/EP2010/061486, filed Aug. 6, 2010 and claims the benefit thereof. The International Application claims the benefits of European application No. 09013689.6 EP filed Oct. 30, 2009. All of the applications are incorporated by reference herein in their entirety.

FIELD OF THE INVENTION

The invention relates to a method of operating a flow line and to a flow line of such kind.

DESCRIPTION OF THE RELATED ART

Production lines for the assembly of e.g. mechanical and/or electrical components are known e.g. from the automotive industry.

Here operators or robots, at multiple assembly stations, produce e.g. a car by assembling specific separate parts at each station to the car which is continuously moved slowly on a conveyor belt along the line to the following station.

However, for heavy industries producing e.g. large turbines, aeroplanes etc. a similar production line may not be feasible as this would require such a durable construction of the conveyer belt which would make the belt both unsuitable in construction and very expensive.

It is an objective of the present invention to provide an advantageous flow line for assembly of heavy machines, preferably a flow line without the above-mentioned disadvantages and most preferred to provide such a flow line technique which is easy to handle and cost effective.

SUMMARY OF INVENTION

To this end, the invention is realized by a method of operating a flow line comprising two or more assembly stations for the assembly of heavy machines such as wind turbine nacelles, the method comprising the steps of:
  installing a prepared assembly trailer in the flow line before or at a first assembly station,
  connecting the said prepared assembly trailer to at least one flow line tow bar,
  if the prepared assembly trailer is installed before said first assembly station then: moving the said assembly trailer to said first assembly station,
  else: moving all the flow line assembly trailers to the next assembly station, whereby the steps of moving the flow line assembly trailers are performed timewise stepwise.

It must be noted in this context that throughout this description and throughout the claims the expression "before"—if not stated in a context of successions of events—is meant to be an indication of place rather than time. It can therefore also be exchanged with the expression "in front of".

Several features of the invention make this process particularly advantageous and easy even though the machines under production are very heavy, i.e. typically above 10 tons:

Firstly, instead of a conveyor belt, use is made of transport units, i.e. trailers which can be realized in such way that they also operate under very heavy loads. For example, such trailer can be realized like a railway car, i.e. with metal wheels that are guided along metal rails. Each trailer being a separate unit which is only interconnected with the other trailers at some time during assembly operation, the trailers can also be equipped with some parts that are essential for several steps of the assembly process. For instance, pre-configured cables can be transported on such a trailer all along the assembly so that the staff have the cables at hand at any time during the whole assembly process.

Secondly, the transport is not continuous but stepwise at certain pre-defined points in time. This implies a massive reduction of risk of injuries, bearing in mind that the parts assembled in such configuration are very large and also very heavy. A constantly moving conveyor system would therefore pose quite a threat in that sense that some parts might fall down and seriously injure staff or damage objects. During the short time when the flow line is in a state when the trailers are transported, all staff can be ordered outside the sphere of the flow line and also asked to remove any objects such as tools from close proximity to the flow line.

Thirdly, use is made of a tow bar, i.e. connection device which is realized in such way that it connects at least two trailers while keeping them at least at a minimum distance, preferably a constant distance. Needless to say, such tow bar can be made up in many different ways, for example as a single piece tow bar in between two trailers or as a multi-part tow bar serially directly connected or indirectly connected via the assembly trailers. In this sense, a coupling as known from railway cars does the trick just as well as two chains which are put together and reinforced by a bar in order to assure that the distance between the trailers remains at least at a certain minimum.

One embodiment of a sequence to operate the invented flow line may be:
Drive with tractor/mover to parking area for empty assembly trailer and connect tractor to assembly trailer
Drive tractor with assembly trailer empty or loaded with set of main cable, centre beams, transport frame and bottom canopy into assembly building
Input of assembly trailer in technical station 1 thereby the trailer have to be aligned in flow direction
Drive out with the tractor
Move (pulling preferred) the assembly trailer to the correct distance to the assembly trailer placed in station 1
Connect the assembly trailer to the tow bar with hydraulic pin from tow bar
Pull the complete flow line (pulled weight 750 t) by 15 meters (50') in order to move the assembly trailer of station 6 to the technical station 2 with hydraulic cylinder and tow bar that covers stations.
Lift the complete assembly trailer with nacelle by 500 mm
Assembling of the 4 base supports to the centre beams
Lower the assembly trailer in order to get the trailer free and the nacelle standing on base supports
Pull out the empty assembly trailer
Load the next set main cable (OPTION)
Drive the empty assembly trailer out of the building to a parking area.

One embodiment of a sequence to run the flow line with outside loading of bottom canopy may be:
Driving of to empty assembly trailer with tractor (both gooseneck and tow bar should be possible) to loading position for set of main cable.
Driving of assembly trailer with tractor to loading position of centre beams
Driving of assembly trailer with tractor to loading position of transport frame Driving of assembly trailer with tractor to loading position of bottom canopy. Loaded on supports on the assembly trailer
Then go on with the sequence to operate the invented flow line e.g. as described before.

A flow line for the assembly of heavy machines such as wind turbine nacelles with two or more assembly stations, comprises according to the invention:
- a number of assembly trailers,
- at least one tow bar connecting at least two assembly trailers,
- a pulling means, i.e. a moving device, which operates according to the following scheme:
a) if the prepared assembly trailer is installed before said first assembly station then: moving the said assembly trailer to said first assembly station,
b) else: moving all the flow line assembly trailers to the next assembly station, whereby the pulling means is further realized in such way that it moves the flow line assembly trailers timewise stepwise.

The invention can in general be described as a flow line for the final assembly of heavy machines such as nacelles of a wind power plant. The flow line comprises equipment which is able to transport the heavy machines through a plurality of work stations. Herefore, for various embodiments of the invention, an assembly trailer will be transported on the floor of the assembly line. During the movement all assembly trailers are moved parallel from one station to the next.

Particularly advantageous embodiments and features of the invention are given by the dependent claims, as revealed in the following description. Thereby, features revealed in the context of the method may also be realized in the context of the rotor blade and the other way round.

Preferably, the connecting of the prepared assembly trailer is done by activating a hydraulic pin on a tow bar which engages to a hydraulic pin receiving area on the trailer.

Furthermore, it is preferred that said prepared assembly trailer is prepared with suitable cables to be installed in said heavy machine.

The method preferably further comprises the step of removing one assembly trailer from the flow line, said removed assembly trailer being the trailer moved from the last of the assembly stations.

Additionally, according to an advantageous embodiment said flow line tow bar connects one assembly trailer to another trailer so as to form a serial connection between the assembly trailers.

Principally, the tow bar may be positioned anywhere in between, underneath or above the trailers. It has proven particularly advantageous if the flow line tow bar is located and operated in a countersunk pit below the assembly trailers. This way it can be made sure that the tow bar does not hinder staff from any operation around the heavy machines during assembly. In addition, this also makes sure that there is no danger of falling over the tow bar during such operations. This embodiment can be further enhanced by at least partially covering said pit, e.g. by means of a cover plate above the pit.

The tow bar may be connected to the trailers throughout all their way along the two line. When using one single tow bar for all trailers, which is preferred, particularly because the tow bar can then be positioned in a pit as described before, a connection of the tow bar to the assembly trailer is preferably engaged while all the assembly trailers are moved and disengaged at least temporarily while all the assembly trailers are at a standstill.

In such case, a particularly preferred embodiment of the invention can be realized, namely that the tow bar is moved from a resting position to a forward position during the movement of the assembly trailers and backwards to the resting position while the connection is disengaged.

The flow line according to the invention is preferably realized such that the pulling means comprises a stationary piston system.

The invention further comprises an assembly trailer suitable for performing the method according to the invention as well as a tow bar suitable for performing the method according to the invention and a heavy machine installed on an assembly trailer according to the invention.

As for various embodiments of the invention, basic data of flow line may be:

For various embodiments of the invention the cycle time will be 2 to 5 hours.

For various embodiments of the invention the time for movement i.e. pulling of the complete flow line is maximum. 5 min. preferred 3 min which correspond to an average speed of 5 m per minute.

For various embodiments of the invention the technical availability is 98%.

For one embodiment of the invention the number of assembly stations is 6.

For one embodiment of the invention the number of technical stations is 2 (1 for input of empty trailer, one for output of last trailer).

For one embodiment of the invention the pulling weight without assembly trailers is 750 t.

For one embodiment of the invention the pulling distance for the complete flow line is the length of one work station with 50', i.e. 15 meters.

For various embodiments the trailers comprise at least one opening to load set of main cable.

For various embodiments the trailers comprise front and rear fixtures for centre beams (F/R) of a nacelle support.

For various embodiments of the invention, the placement of the buttom canopy on front and rear supports at the assembly trailer.

For one embodiment the invention comprises a horizontal placement of the upper edge of the bottom canopy when assembled to the yaw.

For one embodiment of the invention, the total weight of product including transport frame, without assembly trailer is max. 110 t.

For various embodiments of the invention, requirements to the assembly trailer may be:
- Mechanical-optical indication of the status of connection (e.g. red connected/yellow disconnected
- Parking brake/Parking safeguard
- Self-Steering of front axle to keep flow direction (passive or active controlled)
- Safety bumper at the front
- Assembly trailer must be easily turn able either when its handled with a gooseneck or a draw bar turning cycle max. 20 m Other objects and features of the present invention will become apparent from the following detailed descriptions considered in conjunction with the accompanying drawings. It is to be understood, however, that the drawings are designed solely for the purposes of illustration and not as a definition of the limits of the invention.

In the following description, the invention for heavy machines is described by the example of a wind turbine nacelle as a nacelle is a good example of a machine which is unsuitable to be assembled by production lines of known technique.

It must however be emphasized that the invention can be applied for many other heavy machine industries also such as the production of steam generators, aero planes etc.

DETAILED DESCRIPTION OF INVENTION

Figure 1:
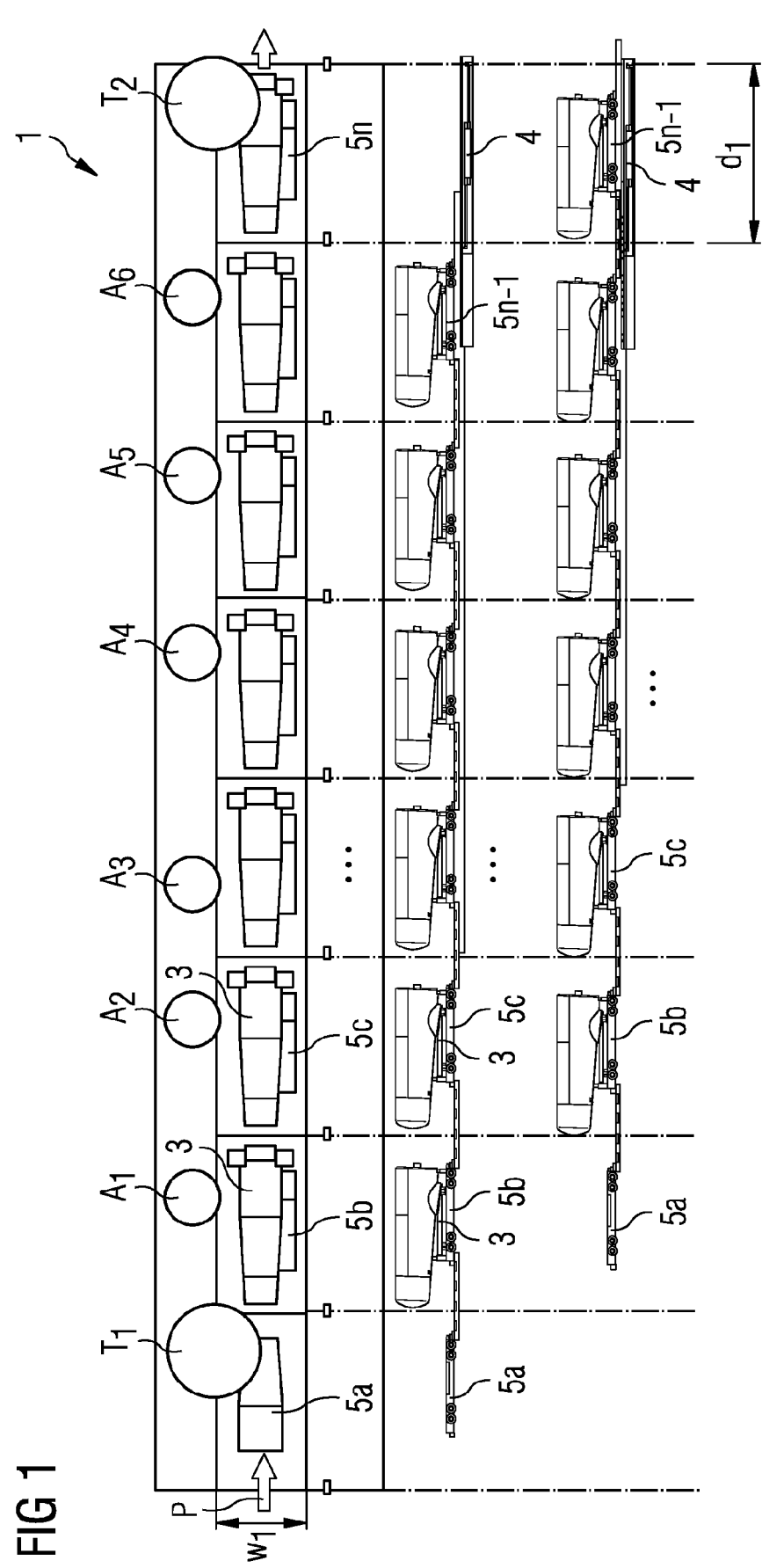
FIG. 1 a view at a flow line according to an embodiment of the invention both from the top and from the side, FIG. 2 a top view and a side view of the floor of the flow line shown in FIG. 1, FIG. 3 a top view of the flow line of the previous figures, with no trailers shown, FIG. 4 a more detailed top view of the flow line of the previous figures, with no trailers shown, FIG. 5 a top view of the second technical station of the flow line according to the previous figures, FIG. 6 a top view of the flow line of the previous figures, with the trailers shown, FIG. 7 a side view of a trailer and a nacelle including an embodiment of a tow bar according to the invention, FIG. 8 a more detailed side view of the tow bar of FIG. 7, with three sectional views of details of the tow bar and with a top view with a trailer, FIG. 9 two side views of trailers as used in the context of an embodiment of the invention, FIG. 10 two side views of a trailer as used in the context of an embodiment of the invention, one view with a nacelle attached, FIG. 11 a side view and a top view of an empty trailer as used in the context of an embodiment of the invention, FIG. 12 a side view and a top view of the empty trailer of FIG. 11 with beams attached, FIG. 13 a side view and a top view of the empty trailer of FIG. 12 with a main cable attached, FIG. 14 a side view and a top view of the empty trailer of FIG. 13 loaded with a transport frame, FIG. 15 a side view and a top view of the trailer of FIG. 14 with a bottom canopy of a nacelle, FIG. 16 a side view and a top view of the trailer of FIG. 15 in a position to be unloaded, FIG. 17 in two side views the flow line according to an embodiment of the invention with a pulling means, FIG. 18 in two side views the trailer as used in the context of an embodiment of the invention during a lifting process, FIG. 19 two sectional views of a lifting unit of the second technical station in two different positions according to an embodiment of the invention, FIG. 20 in two side views the trailer of FIG. 18 during a process where legs are attached to the beams, FIG. 21 in two side views the trailer and the nacelle of FIG. 19 during a process while the trailer is moved away, FIG. 22 in two side views the nacelle of FIG. 19 during a process of being prepared to be moved away, FIG. 23 a top view of an embodiment of the flow line according to an embodiment of the invention with parts of a security system, FIG. 24 a top view and a detail view of the security system of FIG. 23, FIG. 25 a top view of an embodiment of the flow line according to the invention with details of parts of a security system, FIG. 26 a top view of an embodiment of the flow line according to an embodiment of the invention with other details of parts of the security system, FIG. 27 a top view of an embodiment of the flow line according to the invention with more elaborated details of a security system and with three detail views.

FIG. 1 shows an embodiment of a flow line 1 according to the invention in a top view and—below—in two side views representing two stages of an embodiment of the method according to the invention.

Nacelles 3 are assembled on trailers $5a, 5b, 5c, \ldots 5n-1, 5n$ at six different work stations $A_1, A_2, A_3, A_4, A_5, A_6$ which are assembled along the flow line 1 in a movement direction p. Before the first work station A1, i.e. in an upstream area adjacent to the first work station A1, there is a first technical station $T_1$, and at the end of the flow line 1, there is a second technical station $T_2$. At the first technical station $T_1$ a new trailer 5a with no nacelle 3 on it yet is supplied and attached to the flow line 1. The width $w_1$ of the work stations $A_1, A_2, A_3, A_4, A_5, A_6$ is approximately 7,5 meters (25 feet), its length $d_1$ about 15 meters (50 feet).

In order to assemble the nacelles 3, in the flow line 1, all trailers $5a, 5b, 5c \ldots, 5n-1, 5n$ of the complete line have to move by the length $d_1$ of one work station $A_1, A_2, A_3, A_4, A_5, A_6$ to the next station within 3 minutes (preferred) and maximally 5 minutes. The pulling may be done e.g. by a hydraulic cylinder 4 as a pulling means. After the movement of the complete line, the last assembly trailer 5n with the completed nacelle 3 will be disconnected from the flow line 1 at the second technical station $T_2$.

In this sense, FIG. 1 shows three stages of the assembly process: In the first stage, represented by the top line shown from above, there is the empty trailer 5a at the first technical station $T_1$ (i.e. upstream the first work station A1) and the last trailer 5n at the second technical station $T_2$ still holds a nacelle 3 which is completely assembled. In the second stage, shown in the second line in a side view, the last trailer 5n has been removed from the second technical station $T_2$. In the third stage shown in the last line, the flow line 1 has been moved one station further so that every nacelle has changed its work stations $A_1, A_2, A_3, A_4, A_5, A_6$. Now, the first trailer 5a has reached a first work station $A_l$ while the second last trailer $5n-1$ has now moved into the position to be taken away from the flow line 1, i.e. the second technical station $T_2$.

Figure 2:
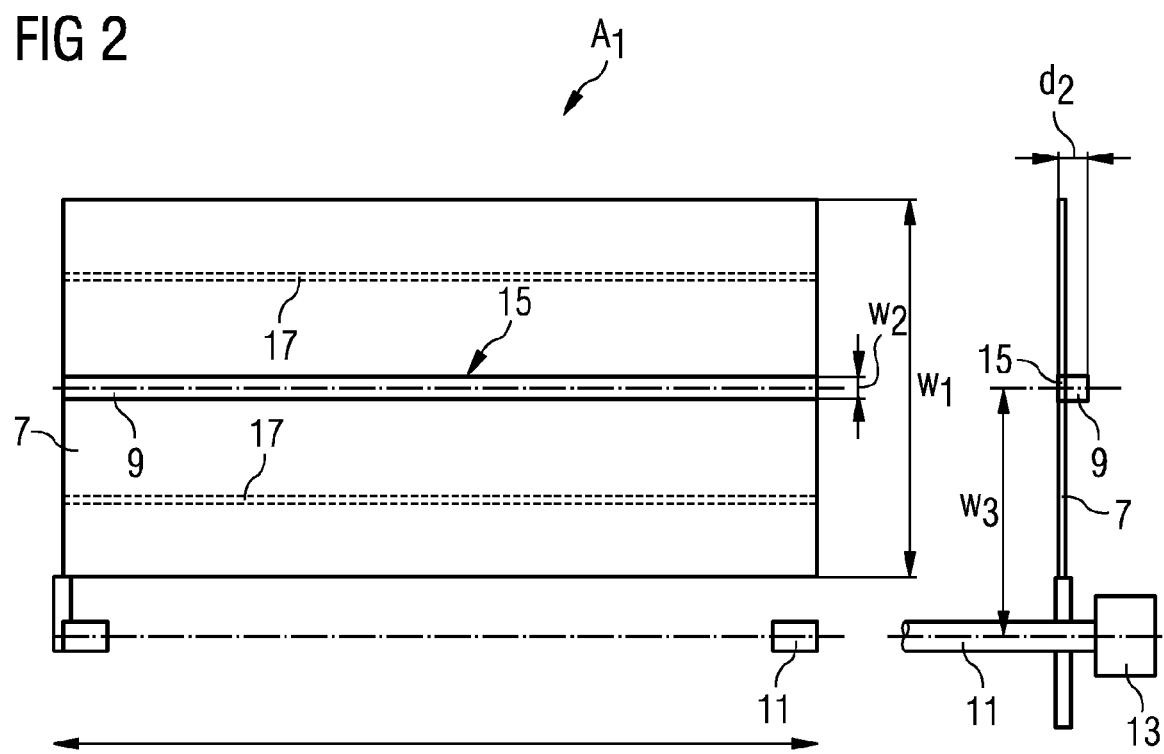

FIG. 2 shows a top view and a section view of the surface of the floor 7 of the first work station $A_1$.

The trailers $5a, 5b, 5c \ldots, 5n-1, 5n$ are moved along two lines 17 over a pit 9 which is covered partially by a plate 15. Along the floor 7, pillars 11 are positioned which may be used to fix tools on them and/or to install platforms at a greater height. The width $w_2$ of the pit 9 is about 500 mm, the shortest distance $w_3$ from the middle of the pit 9 to the pillars 11 is about 5000 mm.

As can be seen in the section view at the right hand side of FIG. 2, the pit 9 has a depth $d_2$ of about 500 mm. The pillars 11 each have a base 13 underneath the floor level which stabilizes them. The pit 9 is the location where a tow bar (not shown) is supplied which serves to interconnect all the trailers 5, as will be explained with recourse to later figures.

Figure 3:
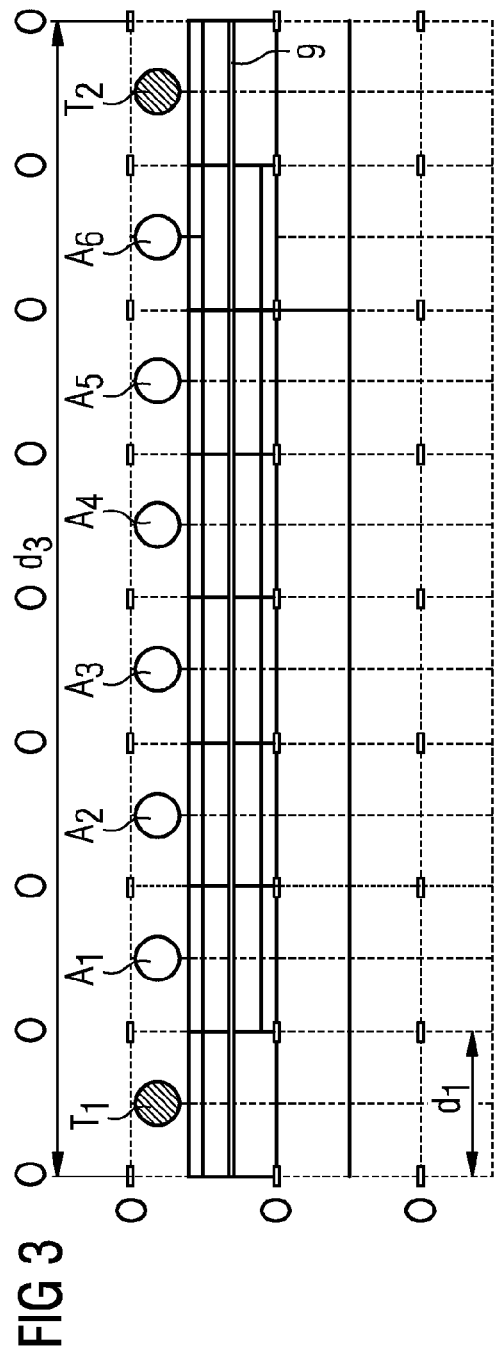

FIG. 3 shows a complete flow line 1 without trailers $5a, 5b, 5c \ldots, 5n-1, 5n$ in a top view. The pit 9 for the tow bar extends right from the beginning of the first technical station $T_1$ to the end of the second technical station $T_2$, i.e. along the complete length $d_3$ of the flow line 1, which is about 120 meters (400 feet).

Figure 4:
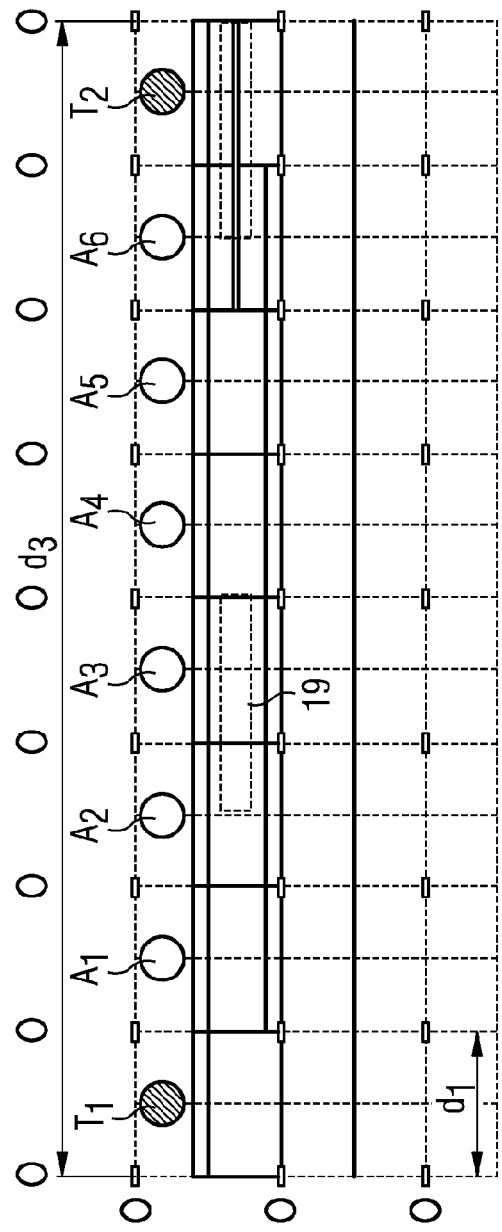

FIG. 4 illustrates the same flow line 1 in which the pit 9 is partially covered by plates 15 as was shown in the context of FIG. 2. In addition, marked areas 19 are indicated, in which stationary piston systems for pulling all the trailers 5 of the flow line 1 can be installed. In these marked areas 19, the depth $d_2$ of the pit 9 may increase to about 800 mm.

Figure 5:
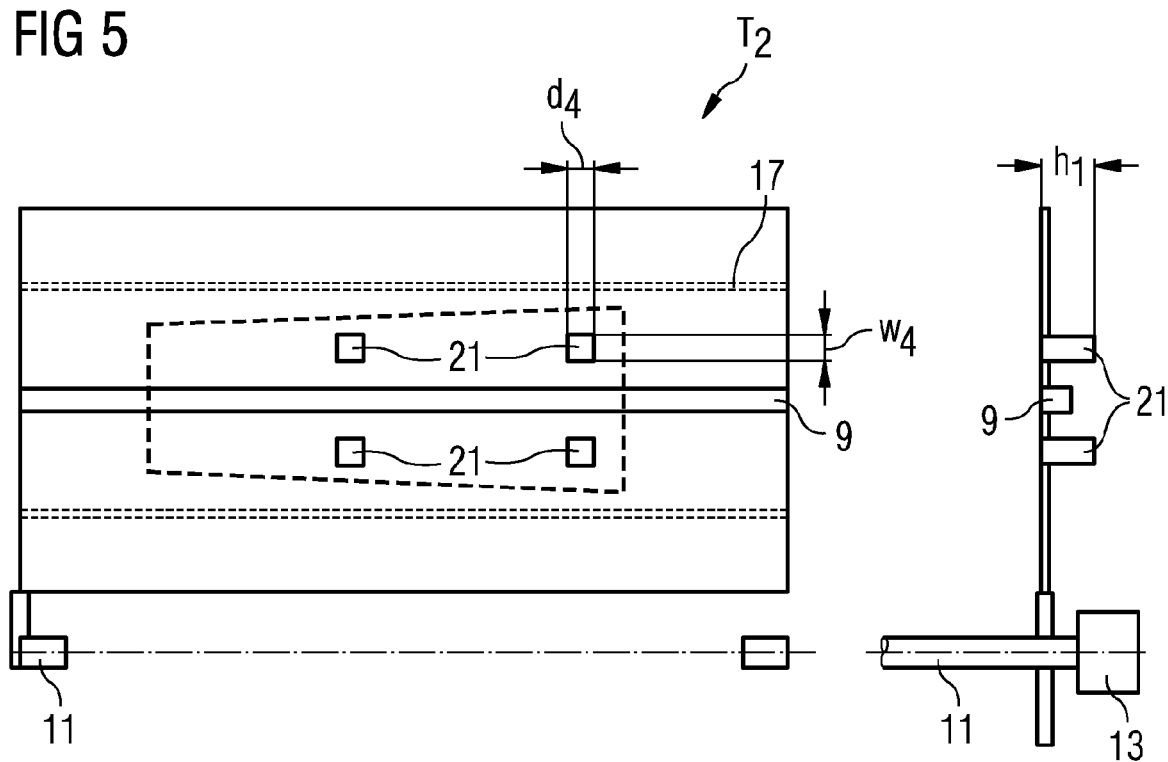

FIG. 5 shows a top view and a section view of the second technical station $T_2$. Apart from the features described in the context of FIG. 2, four additional pits or holes 21 for installment of a stationary lifting device are shown. The holes 21 are assembled in the form of an oblong. The lifting device may e.g. comprise hydraulic cylinders which are affixed in the holes 21. The holes 21 have a length $d_4$ and width $w_4$ of 500 mm, i.e. they are sqare-shaped. Their depth $h_1$ is approximately 1000 mm.

Thus, at the technical station $T_2$ there have to be foreseen lifting units to lift the completely assembled trailer $5n$ in order to assemble the support bases of the support of the readily assembled nacelle 3. Then the assembly trailer $5n$ has to be lowered to the floor. Thereby the nacelle 3 will be placed on the floor carried on the nacelle support. The assembly trailer $5n$ is now free and has to be pulled out with a tractor.

Figure 6:
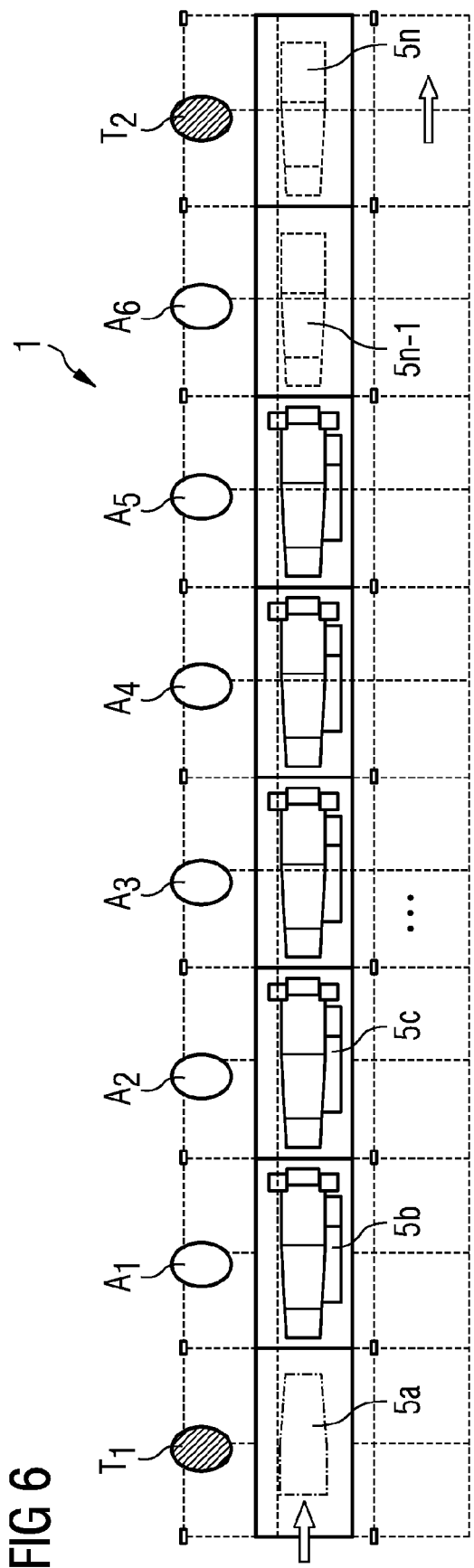

FIG. 6 shows a top view of the complete flow line 1 again which is used to explain a distribution of weights. At the first technical station $T_1$, only the trailer $5a$ plus some first equipment parts weighing 13 t is positioned, at the first work station $A_1$, there is added that of parts of a nacelle 3, so that the overall weight is 48 t. At the second work station $A_2$, the overall weight is 50 t, at the third work station $A_3$ it is 110 t, whereas at the fourth to sixth work station $A_4$, $A_5$, $A_6$, it has reached the maximum weight of 115 t. It may be noted that the weight values given exclude the weight of the trailers.

If one adds all these weights together, one comes to an cumulative weight of 566 t for a flow line with six work stations $A_1$, $A_2$, $A_3$, $A_4$, $A_5$, $A_6$. In accordance, a flow line with only five work stations will have a cumulative weight of about 500 t, one with seven work stations about 650 t and one with eight work or assembly stations about 750 t. This cumulative weight has to be moved during the assembly process. Therefore, it can be clearly understood that a conveyor belt system is useless for this purpose because it cannot resist the forces due to the massive weights. The amount of cumulative weight is also the reason why the flow line is moved stepwise instead of continuously. The pulling speed during such stepwise movement is about 5 m per minute +/−20%. This means that for moving the flow line 1 one work station $A_1$, $A_2$, $A_3$, $A_4$, $A_5$, $A_6$ further over the distance $d_1$, it takes approximately 3 minutes. This relatively slow movement makes sure that no parts of the nacelles 3 are in danger of falling down from the trailers $5a$, $5b$, $5c$ . . . , $5n-1$, $5n$ and that a pulling system (not shown) can cope with these enormous weights.

Figure 7:
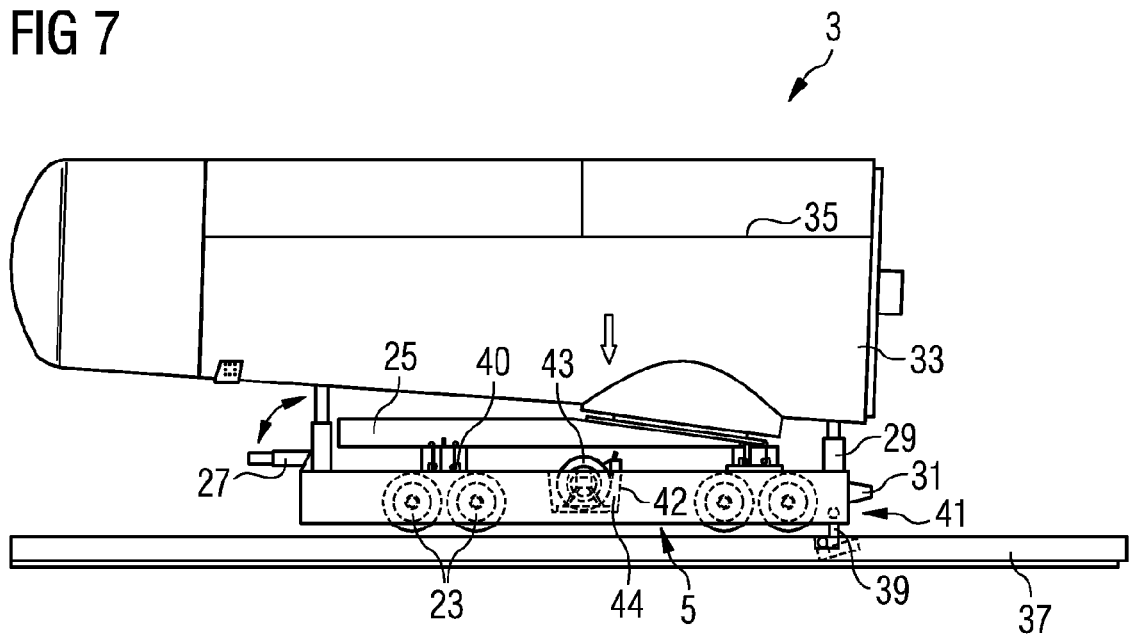

FIG. 7 shows a completed nacelle 3 assembled on a trailer 5 which is connected to a tow bar 37 so that it can be part of a flow line according to the invention.

The trailer 5 has a rigid horizontal structure 42 which rests on the ground via four wheelsets 23. On the side of the structure 42 facing away from the wheelsets 23 two central beams 40 protrude from the structure 42. They are orientated in a perpendicular direction to the plane of the figure. The position of the central beams 40 is between two wheelsets 23 in longitudinal direction along the structure 42. The structure 42 also comprises an opening 44 facing into the same direction as the central beams 40 which houses a main cable 43, i.e. a set of preconfigured cables for use during the assembly of a nacelle.

In addition to the central beams 40, the trailer 5 also comprises a fixed support 29 at its right hand side longitudinal end and a replaceable support 27 which can be tilted from a vertical orientation into a horizontal orientation on its left hand side longitudinal end.

On the central beams 40 there rests a horizontally orientated nacelle transport frame 25 which carries a central part of the nacelle 3. The fixed support 29 and the replaceable support 27 also serve to carry the nacelle 3 in a region of the so-called bottom canopy 33 of the nacelle 3 and thus to stabilize the connection between the trailer 5 and the assembly. When aligned in the correct, i.e. desired, way, the upper edge 35 of the bottom canopy 33 of the nacelle 3 is horizontal.

At the right hand side of the trailer 5, there is a hook 31 attached by which the trailer 5 can be connected to a tractor. Instead of a hook 31, a gooseneck can also be used.

Looking at the underside of the trailer 5, there is shown a tow bar 37 which rests in the pit 9 which was shown in FIG. 2. A hydraulic pin 39 protrudes from the longitudinal extension of the tow bar 37 in the direction of the trailer 5, i.e. out of the ground. The hydraulic pin 39 connects the tow bar 37 to the trailer 5 once it is inserted into a pin receiving area 41 of the trailer 5.

Figure 8:
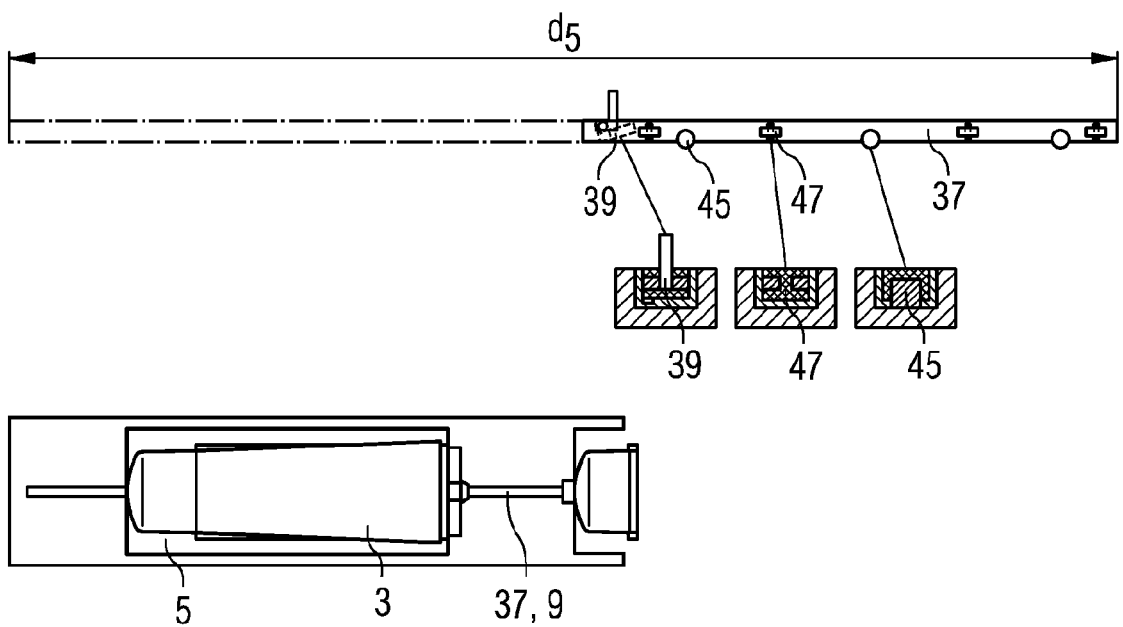

FIG. 8 shows the tow bar 37 in a more detailed side view and in a top view with trailers standing above it. The tow bar 37 has a length $d_5$ of approximately 120 meters, i.e. a length essentially equal to that of the flow line itself. This one single tow bar 37 thus connects all trailers $5a$, $5b$, $5c$ . . . , $5n-1$, $5n$ of the flow line 1. Apart from the hydraulic pin 39 the tow bar 37 further comprises floor rolls 45 and side guiding rolls 47 which make possible a smooth gliding along the longitudinal extension of the tow bar 37. From the top view at the bottom of FIG. 8 it can be understood that with the tow bar 37 being in the pit 9, workers can walk all around the nacelle 3 without being hindered by the tow bar 37. For that purpose, the upper edge of the tow bar 37 must be essentially even with the ground or a covering plate (not shown) must cover the pit as shown in FIG. 2.

Figure 9:
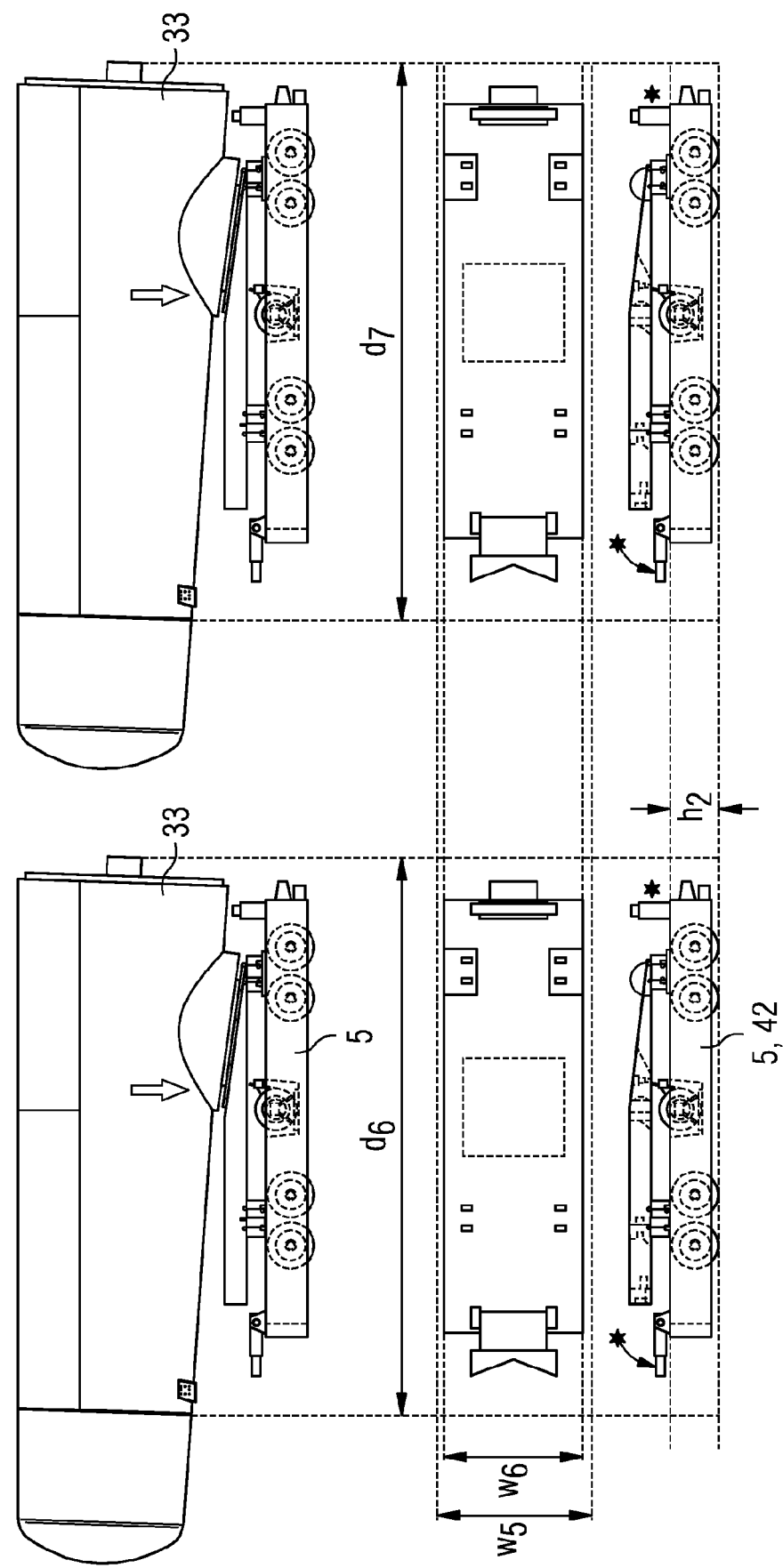

FIG. 9 shows the preferred and maximum dimensions involved in an arrangement of a trailer 5 and a nacelle 3 as depicted in FIG. 7. The preferred length $d_6$ of the bottom canopy 33 is 8980 mm, while its maximum length $d_7$ is 9350 mm. Its preferred maximum width $w_6$ is 2500 mm, while its biggest possible maximum width $w_5$ is 2800 mm. The height $h_2$ of the trailer 5 up to the upper end of the rigid structure 42 is 800 mm.

Figure 10:
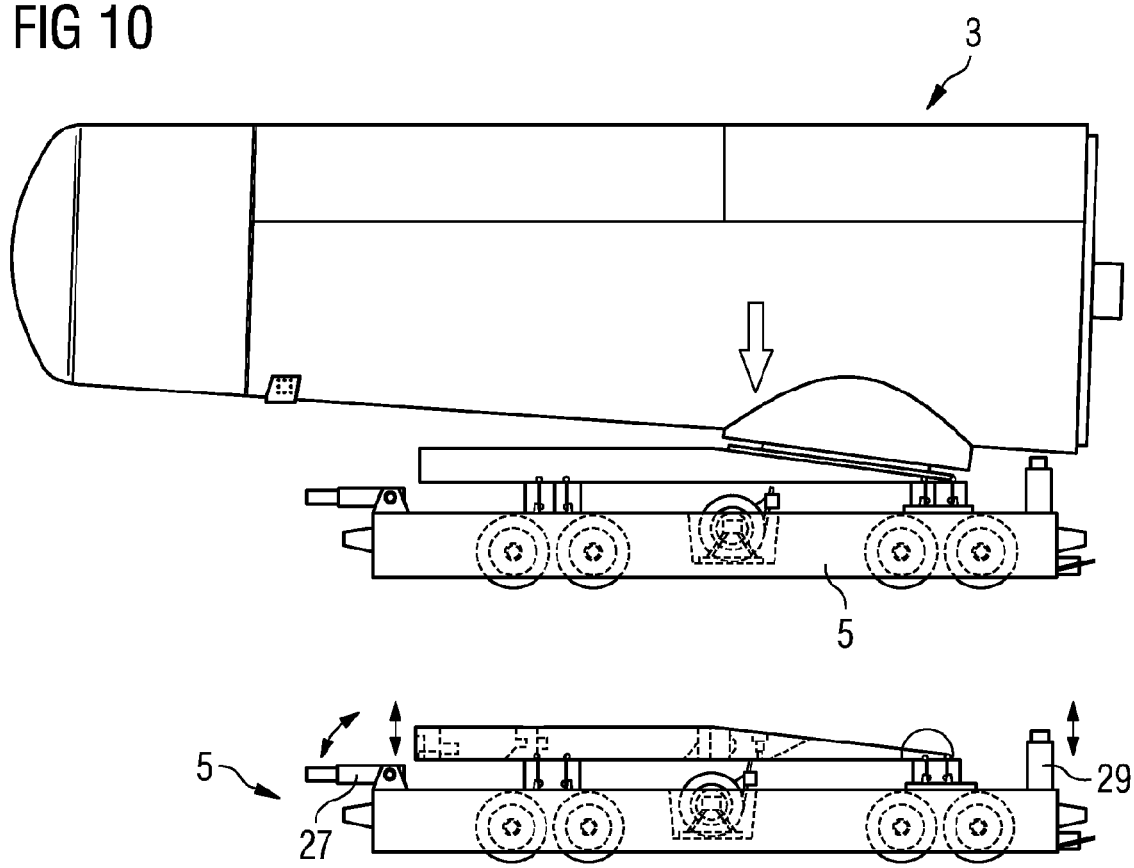

FIG. 10 shows in a side view both the combination of a trailer 5 with a nacelle 3 and a trailer 5 alone. From the bottom drawing, it can be seen that both the fixed support 29 and the replaceable support 27 can be adjusted in height.

Figure 11:
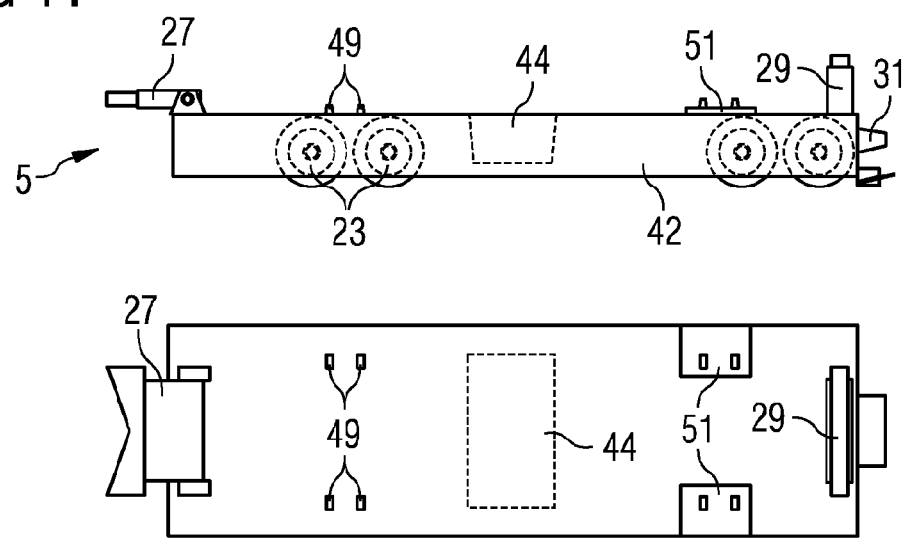

FIG. 11 shows the trailer 5 in a side view and a top view. Apart from the features already discussed in the context of previous figures, there are shown two adapters 49, 51 for positioning the central beams 40 which are not drawn in this figure for reasons of clarity. The first adapter 49 comprises four pin-like railings protruding from the plain of the plain of the rigid structure 42. They are aligned in such way that a beam 40 can be fixed on them in a rectangular way with respect to the longitudinal extension of the trailer 5. Accordingly the second adapter 51 is aligned, however it comprises a base plate of a height of 108 mm from which its pins protrude. This way it can be made sure that the bottom canopy 33 is orientated such that its upper edge is horizontal (cf. FIG. 7).

FIG. 12 shows the trailer 5, again in a side view and a top view, with the beams 40 attached to the adapters 49, 51.

FIG. 13 shows the trailer 5, again in a side view and a top view, furthermore equipped with a main cable 43 comprising—as can be seen in the top view—a set of single cables that are all assembled on a wheel drum as a de-winder so that they can be readily rolled off for installation purposes during the assembly of the nacelle. This way some part of the assembly parts, i.e. the cables are readily at hand any time during the assembly.

Figure 14:
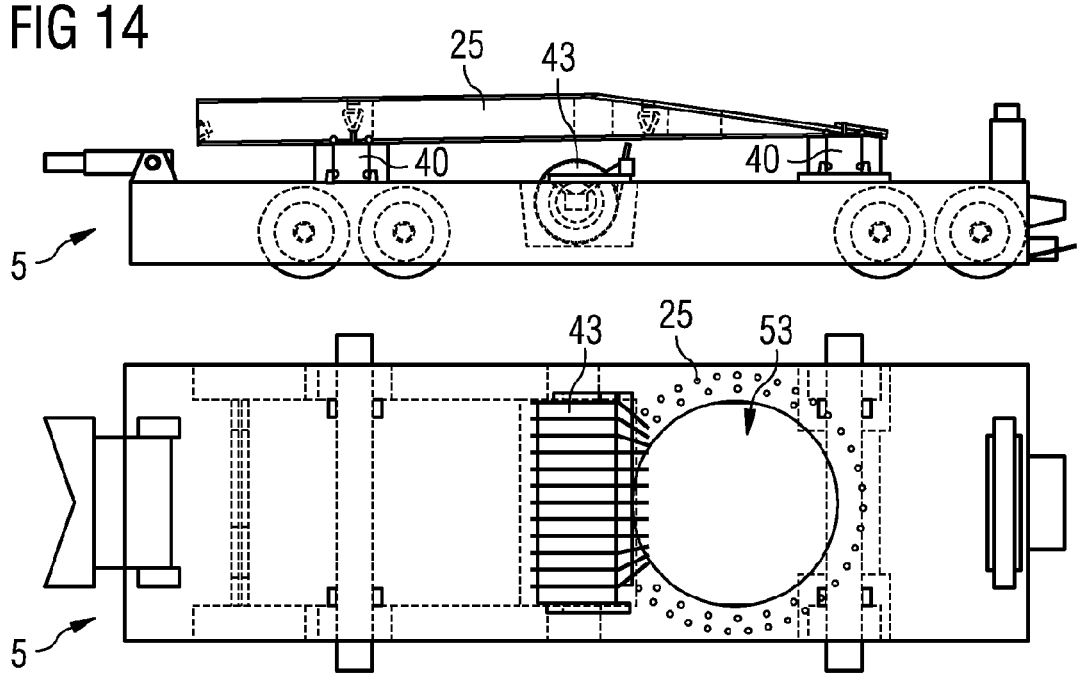

FIG. 14 shows the same trailer in the same views with the nacelle transport frame 25 attached. The transport frame is carried by the central beams 40, and, as can be seen in the top view, it has an opening 53 through which cables from the main cable 43 can be led.

Figure 15:
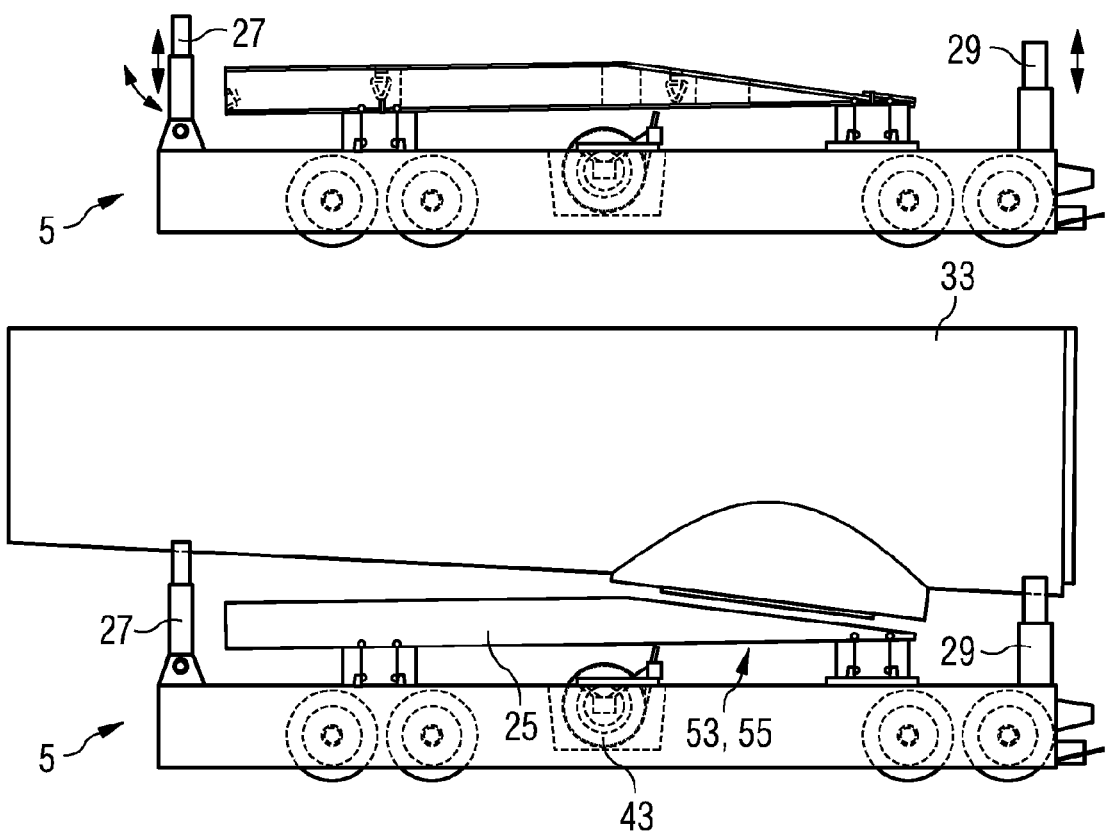

This effect becomes clearer when looking at FIG. 15. which shows in a side view on top the trailer 5 in the same state as in FIG. 14, however with the fixed support 29 and the replaceable support 27 being adjusted to the necessary height, the replaceable support 27 being in an upright position.

In the bottom drawing, the bottom canopy 33 of a nacelle 3 is shown as it is fixed to the transport frame 25. The loaction of the opening 53 of the transport frame 25 corresponds to that of a canopy opening 55 of the bottom canopy so that cables from the main cable 43 can be introduced into the nacelle 3 through these openings 53, 55.

Figure 16:
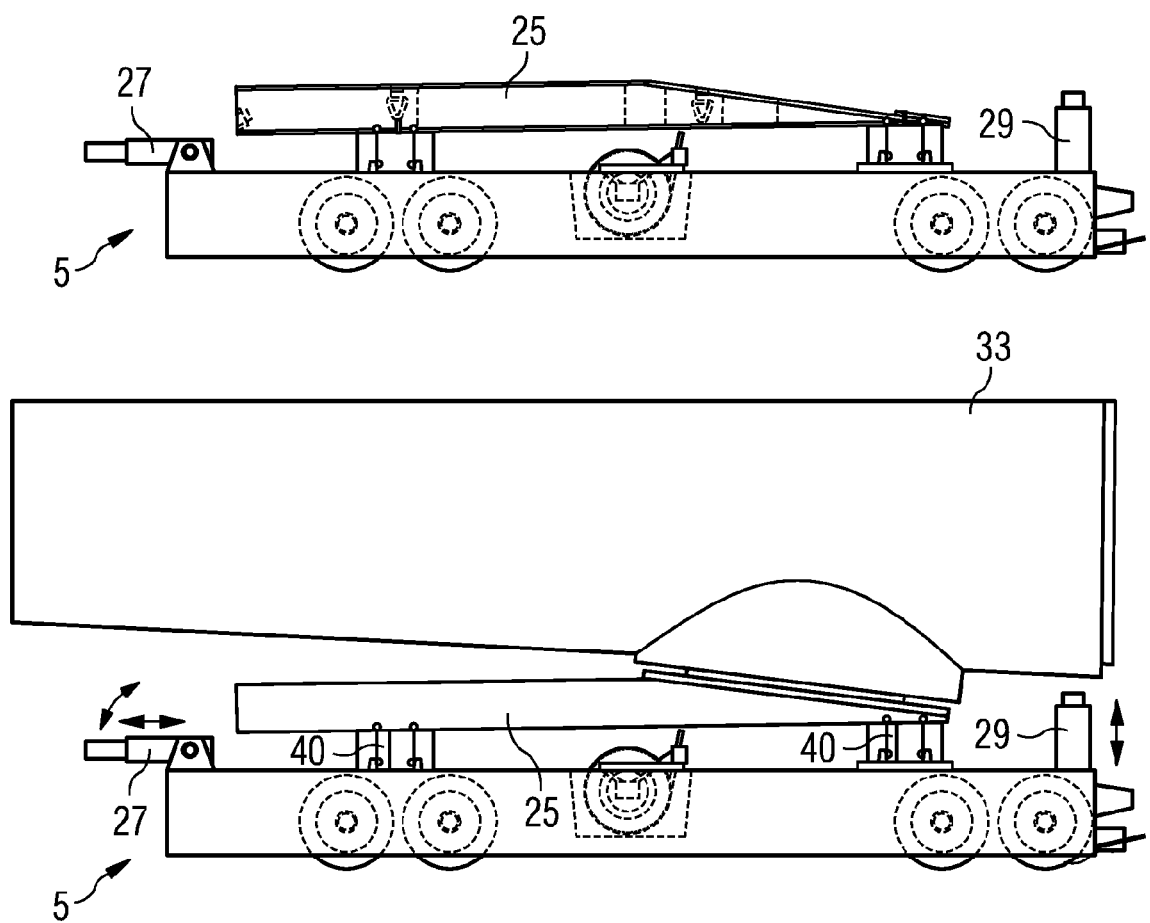

FIG. 16 shows the trailer 5 in two side views with the fixed support 29 and the replaceable support 27 being lowered, the replaceable support 27 being in a horizontal orientation. As can be seen in the bottom drawing, the nacelle 3, of which only the bottom canopy is shown, can be lifted off the trailer 5 as it is only fixed to it via the transport frame 25 resting on the beams 40.

Figure 17:
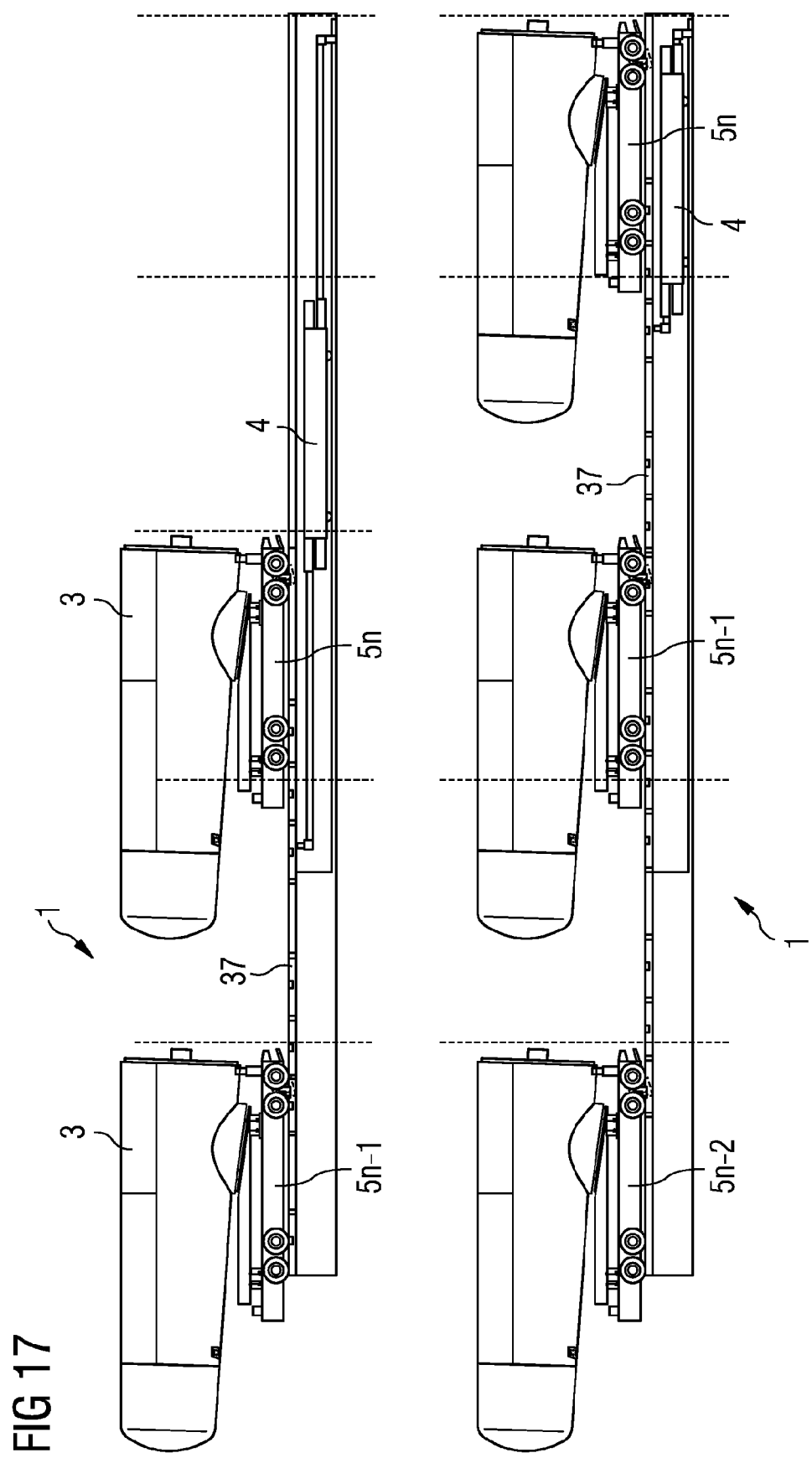

FIG. 17 shows the process of moving the flow line 1 one station further. To this end, a pulling means 4 comprising a stationary piston system is attached to the tow bar 37. As the tow bar 37 connects all trailers 5a, 5b, 5c . . . , 5n-2, 5n-1, 5n, by pulling it using the stationary piston system 4, all the trailers 5a, 5b, 5c . . . , 5n-2, 5n-1, 5n will be pulled at the same time along a distance of 15 meters. After the moving process, the tow bar 37 is in a forward position and the connections of the tow bar 37 to the trailers 5a, 5b, 5c . . . , 5n-2, 5n-1, 5n can be disengaged. When all the trailers 5a, 5b, 5c . . . , 5n-2, 5n-1, 5n are at a standstill again, the stationary piston system 4 can move the tow bar 37 back into its previous position, i.e. its resting position.

Figure 18:
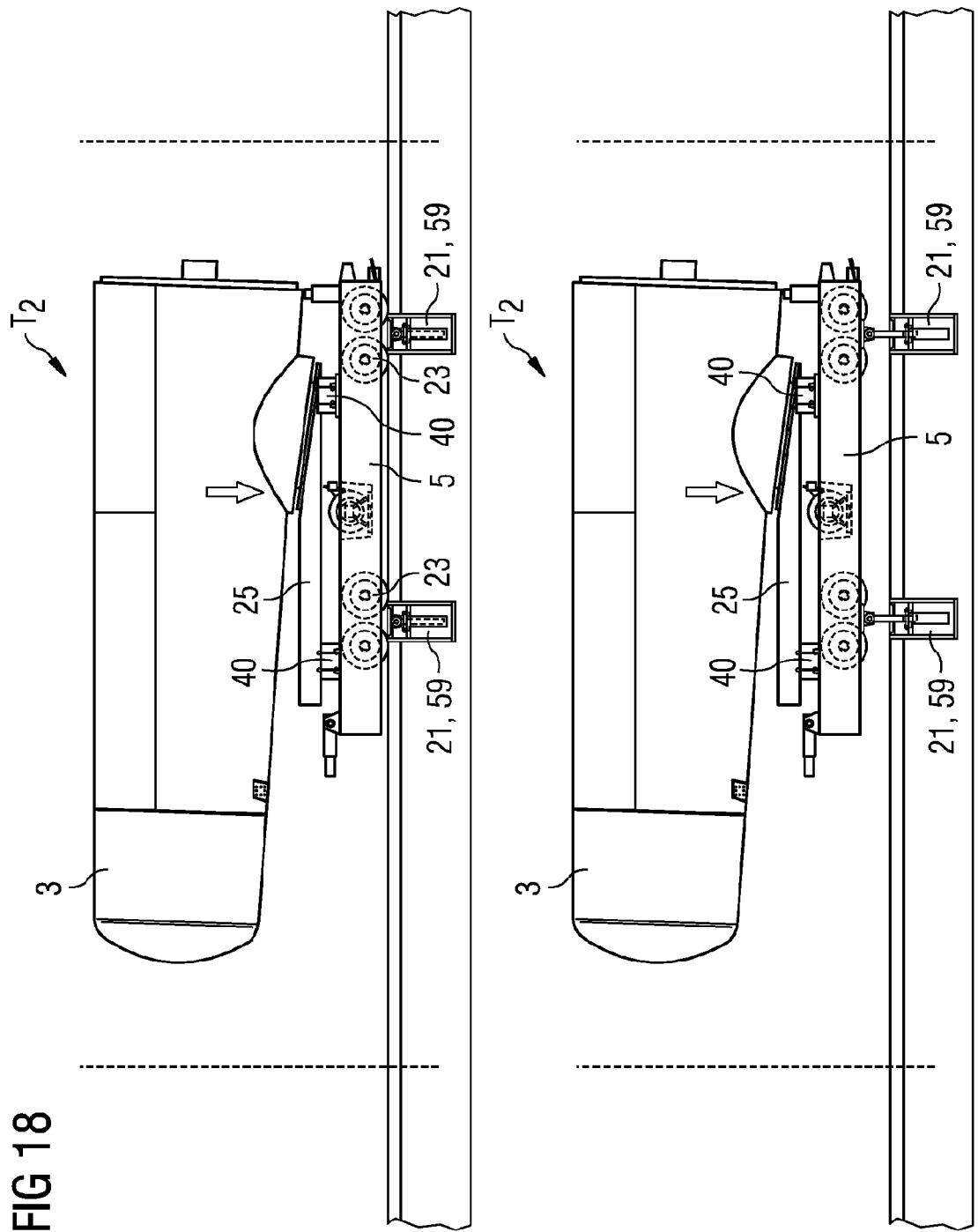

FIG. 18 illustrates according to one embodiment of the invention, the take-out of the trailer 5 in a side view.

In the initial situation, shown in the top drawing, the assembly trailer 5 has been pulled 15 m to the technical station $T_2$. The tow bar 37 has been disconnected. The fixed support 29 and the replaceable support 27 are lowered, the replaceable support 27 being in a horizontal orientation. The trailer 5 is positioned such that the position of its wheelsets 23 correspond with those of hydraulic lifting units 59 which are inserted into the ground in the holes 21 which have been mentioned in the context of FIG. 5. This position is defined by markings on the ground (not shown). The correct positioning can be checked by a sensor (also not shown). The hydraulic lifting units 59 have "elefant feet" at their top facing in the direction of the trailer 5.

In a lifting situation, these hydraulic lifting units 59 have been lifted so that the trailer 5 including the center beams 40, the transport frame 25 and the nacelle 3 is in a lifting position. The hydraulic lifting units 59 thus carry a weight of 110 t plus the weight of the trailer 5. The stroke of the hydraulic lifting units 59 is approximately 400 mm and at a maximum 500 mm.

Figure 19:
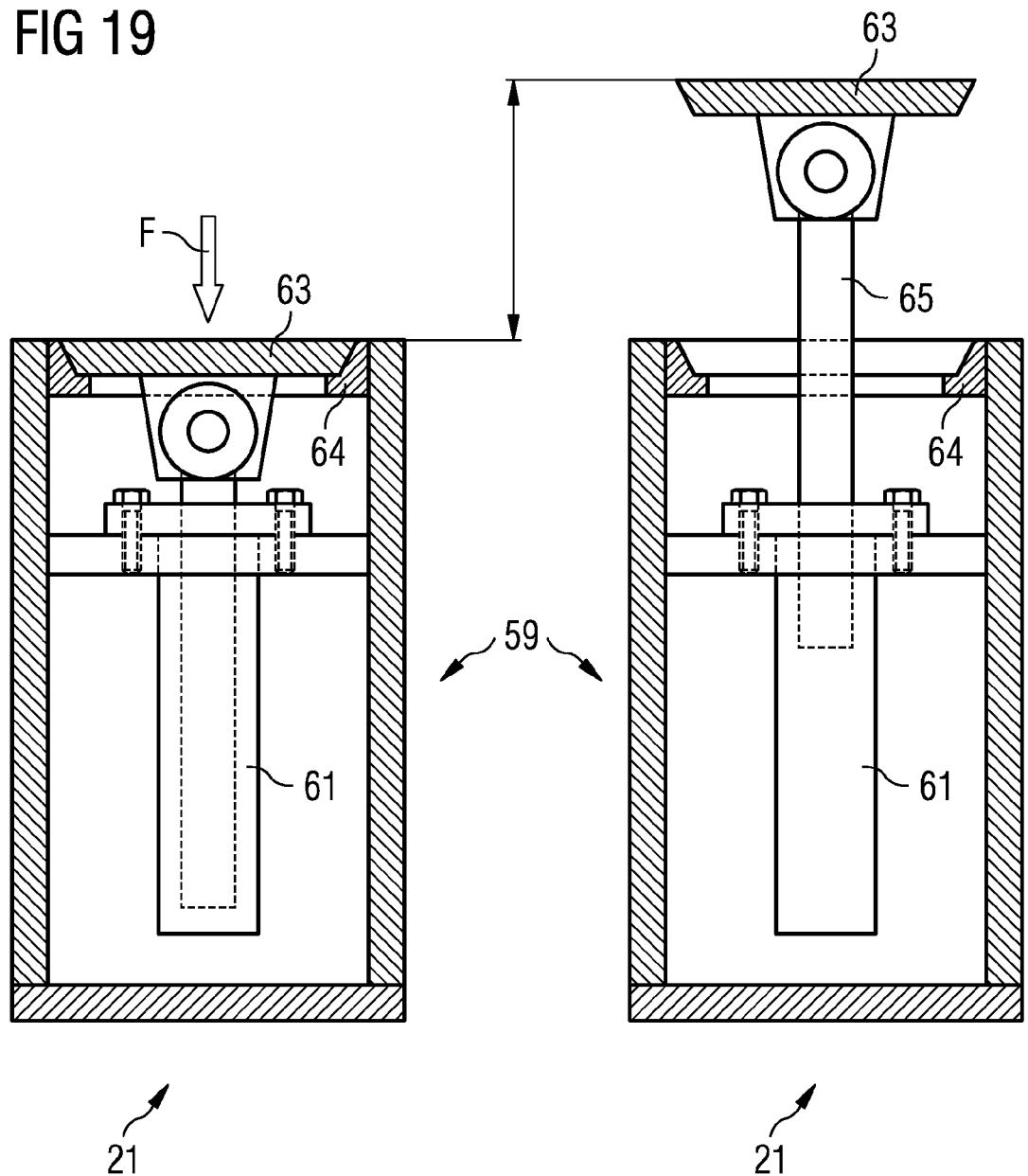

FIG. 19 illustrates for various embodiments of the invention, the lifting of the assembly trailer 5 at the second technical station $T_2$.

Beforehand, it can be stated that the designs of the assembly trailer 5 and that of the lifting units 59 have to be concerted. The lifting units 59 are installed in the holes 21 in the ground of the flow line 1 at the technical station $T_2$. They comprise each a hydraulic cylinder 61 in which a piston 65 can move upwards and downwards. The piston 65 has an end directed away from the cylinder 61 which comprises a so-called elephant foot 63. In a resting position as shown in the left hand side drawing, the elephant foot 63 is in one plane with a lifting plate 64 which closes the lifting unit 59 in the upward direction. The design of the lifting units 59 should enable their installation in one step, the access to the lifting units 59 can be allowed through the lifting plate 64. The operation of four lifting units 59 at the same time enable a save and synchronized lifting process of the assembly trailer 5. Each lifting unit 59 can carry a weight of approximately 600 kN, because they must be designed to carry the complete pulling force of a pulling tractor (in case the tractor is running over the lifting unit during pulling).

The upper and lower end position of the lifting units in operation are scanned by position switches (not shown).

As mentioned, the stroke of the lifting units is 500 mm, assuming that the assembly trailer 5 is 800 mm in height, and accordingly more if the height of the assembly trailer 5 is smaller.

In order to secure the lifted assembly trailer 5, mechanical fall arresters (not shown) are connected to the lifting units 59.

Figure 20:
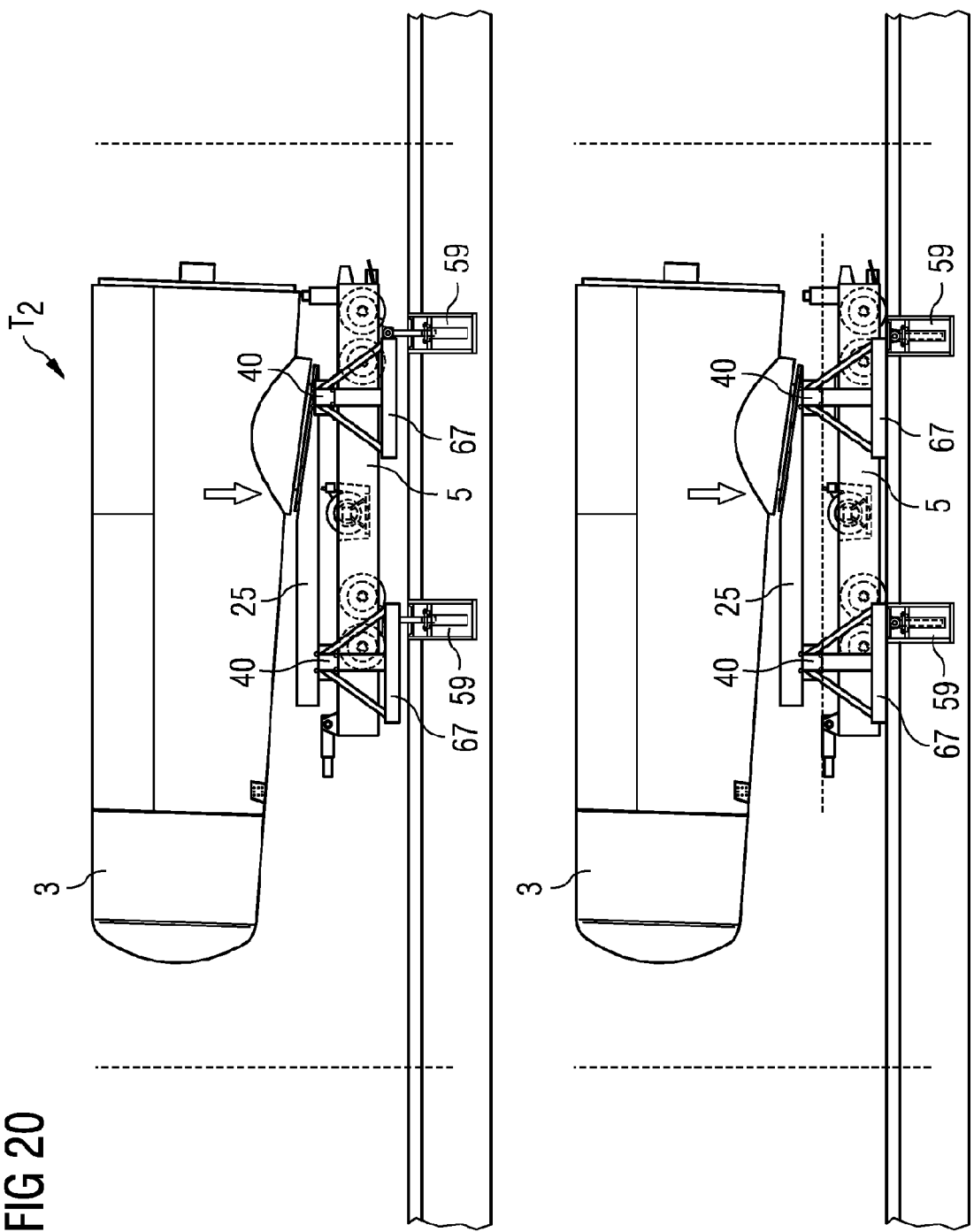

FIG. 20 illustrates for various embodiments of the invention, the assembly of nacelle supports 67.

As shown in the top drawing, once the trailer 5 with the nacelle 3 has been lifted by the lifting units 59, four legs 67 are attached as nacelle supports to the two central beams 40, one at either end of each beam 40.

The bottom drawing shows that the lifting units 59 are then lowered into their resting position, while the transport frame 25 now rests via the beams 40 and the legs 67 on the ground. This lowering of the assembly trailers 5 is reached by synchronous lowering of the four hydraulic lifting units 59. All four legs 67 of the nacelle support must be placed to floor at the same time. Therefore the height difference of approx. 110 mm between the front and the rear of the nacelle 3 has to be taken in consideration.

When the legs 67 of the nacelle support are seated on the floor, the assembly trailer 5 releases from the central beams 40 and the nacelle support carries the transport frame 25 with the nacelle on top.

Figure 21:
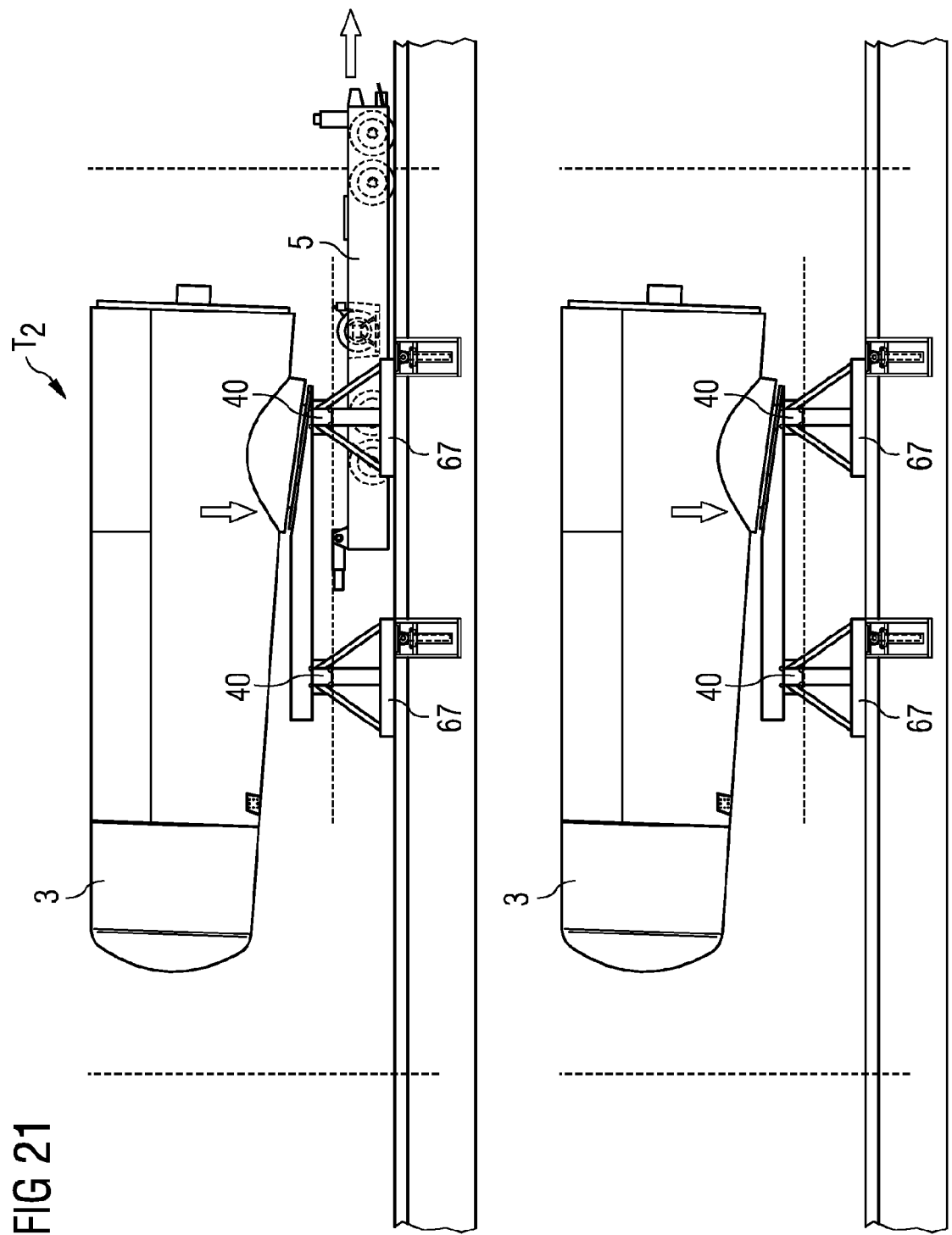

FIG. 21 illustrates for various embodiments of the invention, the further process after the trailer 5 and the nacelle 3 have been separated.

The assembly trailer 5 is driven away by a tractor or a fork lift (not shown). The assembly trailer 5 and all superstructure on it have to stay within a maximum height of 1000 mm, because the clearance under the central beams 40 is 1100 mm.

The nacelle 3 is now parked on the legs 67 of the nacelle support and ready for take over by a transport trailer.

Figure 22:
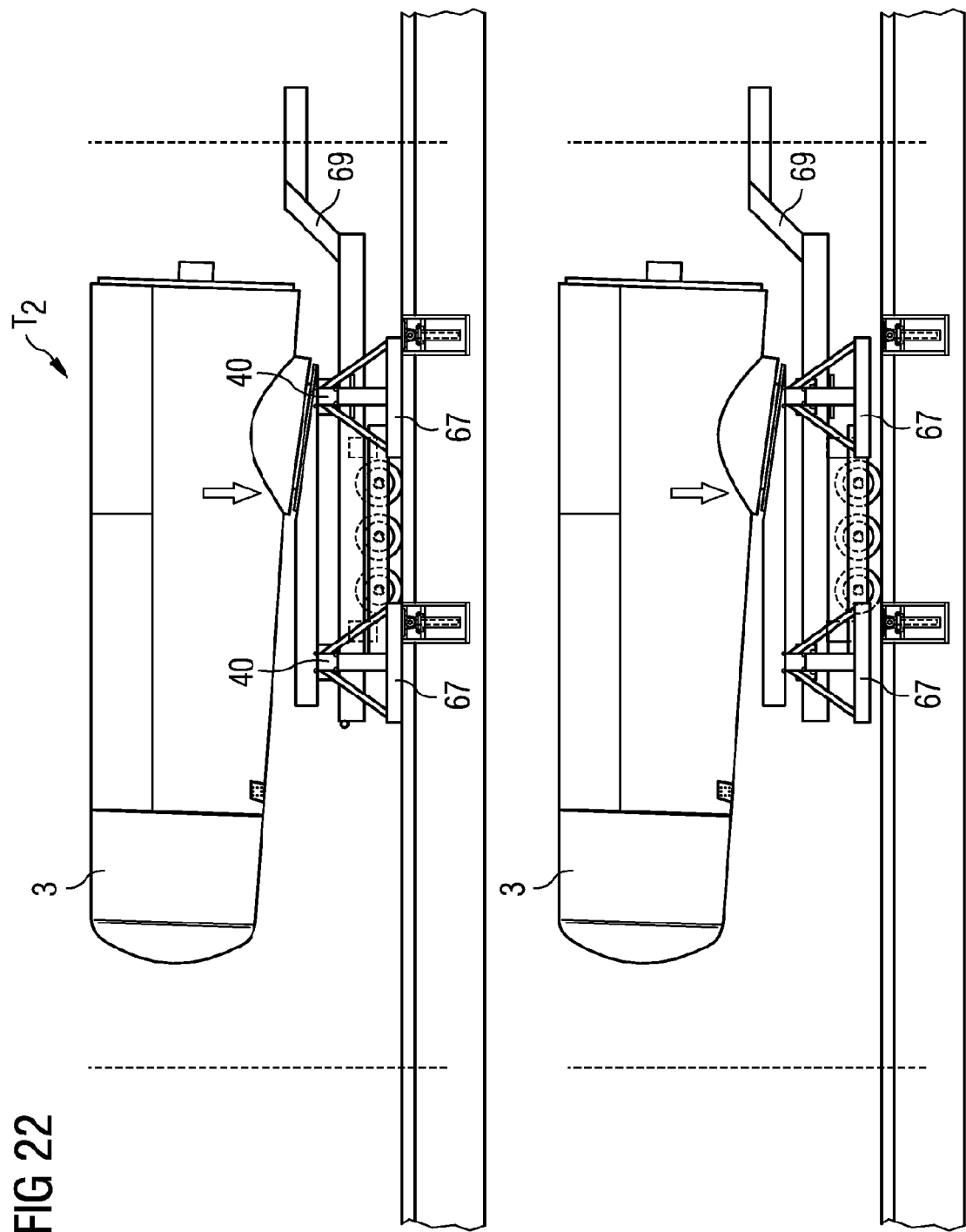

FIG. 22 illustrates for various embodiments of the invention, the driving under, lifting and driving out of the nacelle from the second technical station $T_2$.

The top drawing shows the nacelle 3 on the support with a transport trailer 69 being driven underneath it, in between the four legs.

The bottom drawing shows the transport trailer 69 in a lifted position which means that the nacelle 3 including the legs 67 has been lifted of the ground by the transport trailer 69. Now, the transport trailer 69 can drive away or be driven away by a tractor and carry the nacelle to a destination of delivery.

Figure 23:
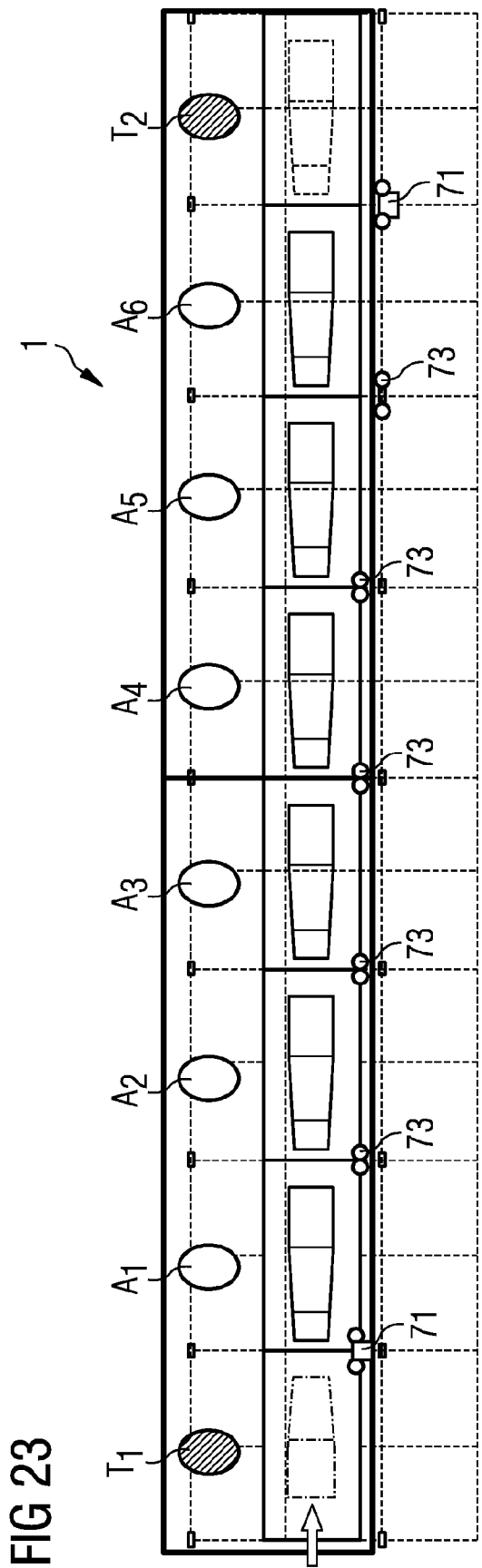

FIG. 23 illustrates for various embodiments of the invention, a safety system definition and operating areas.

The system indicates that the flow line 1 is in condition for moving and all safety requirements are fulfilled and the safety system is in an ok-status.

The first five work stations $A_1$, $A_2$, $A_3$, $A_4$, $A_5$ constitute working areas for assembly and logistic operators. During the pulling of the flow line this area is locked by a barrier tape. The sixth work station $A_6$ constitutes a working area for cleaning and painting. An operator working in the area of this work station A6 should be specially trained and equipped, e.g. with a breathing protector.

At both technical stations $T_1$ and $T_2$ only right trained operators should be admitted to work.

For the purpose of control, two operator panels 71 are positioned between the technical stations $T_1$, $T_2$ and their neighbouring work stations $A_1$, $A_6$. The trained operators working in the technical stations $T_1$, $T_2$ and in the sixth work station $A_6$ can use these operator panels 71 in order to make sure than in preparation of, during and in the aftermath of the pulling process of the flow line 1 no personell is present in close proximity of the flow line 1. Additionally, clearance buttons 73 between all the work stations $A_1, A_2, A_3, A_4, A_5, A_6$ are installed so that staff can signal they have cleared the areas of the work stations $A_1, A_2, A_3, A_4, A_5, A_6$.

Figure 24:
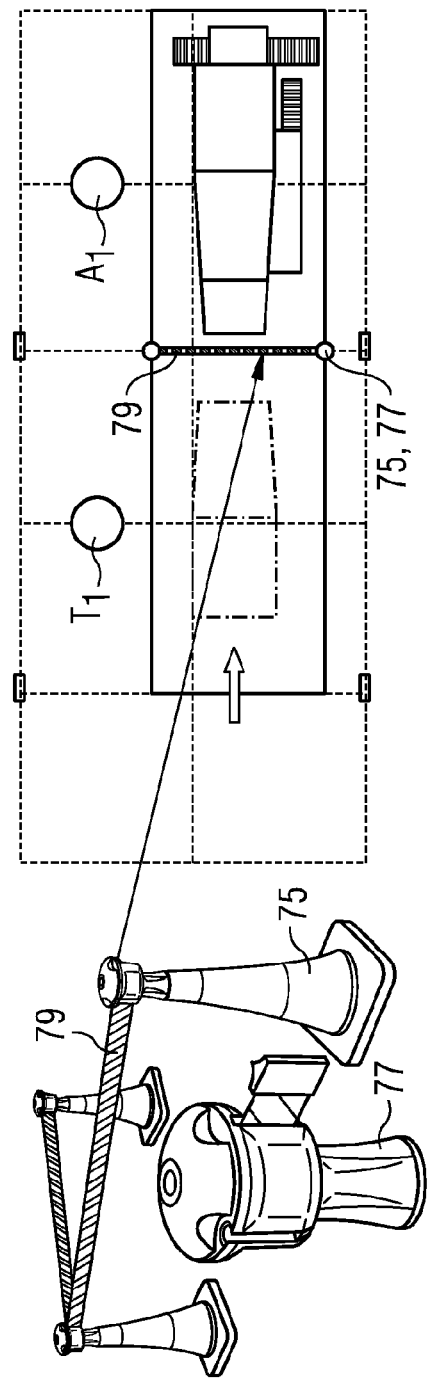

FIG. 24 illustrates a safety system according to one embodiment of the invention.

The safety system comprises a barrier tape 79 which can be stretched in between posts 75 which are equipped with roller shutters 77 on top in which the barrier tape 79 can be fixed. As depicted at the right hand side drawing, such barrier tape 79 can be spread between the first technical station $T_1$ and the first work station $A_1$ during assembly operation time in order to prevent walking in of operators into the first technical station $T_1$ during the supply of a next assembly trailer.

When the barrier tape 79 is taken out of the bracket of the roller shutter 77 an optical and an acoustical alarm signal is activated automatically (security query). There is also an emergency button at each post 75. Optionally a radio controlled dead-man's control can activate a security alarm.

Figure 25:
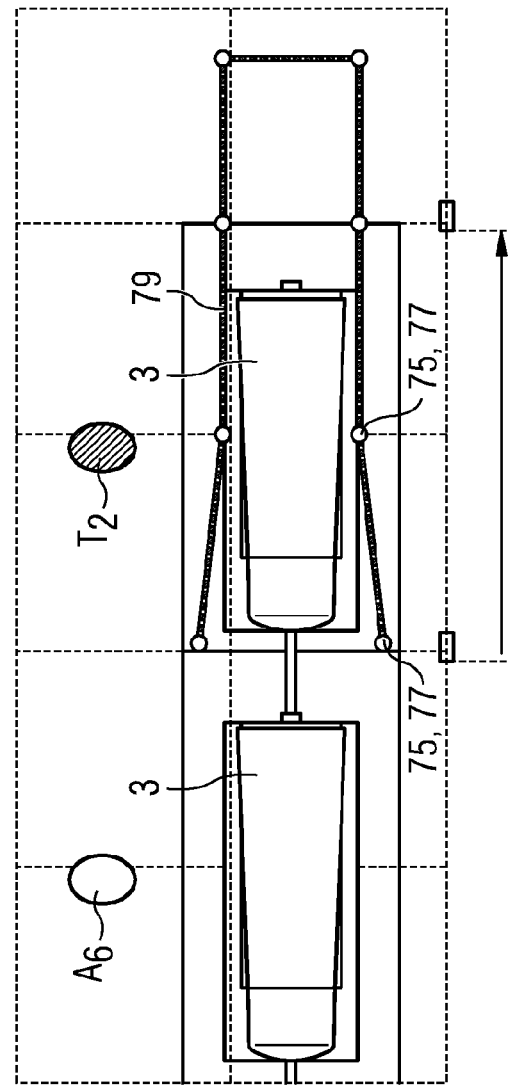

FIG. 25 illustrates a safety system according to various embodiments of the invention in the region of the second technical station $T_2$.

The outlet gate of the paint booth at the sixth work station $A_6$ is normally closed and has a security trigger with a connection to the security system.

During the operation of the tractor, i.e. while a completed nacelle 3 is pulled away from the second technical station $T_2$, and in preparation of this (lifting of the assembly trailer $5n$, assembly of the nacelle support legs 67, take-out of the assembly trailer $5n$) the security trigger at the roll shutter is activated.

The rest of the second technical station $T_2$ including the complete driving area of the tractor is locked by barrier tape 79. When the barrier tape 79 is taken out of the bracket of any of the roller shutters 77 an optical and acoustic alarm signal is activated automatically and the engine of the tractor is powered off directly. There is also an emergency button at the posts 75. When the tractor is pulling out the empty assembly trailer 5 of the second technical station $T_2$, or driving in the transport trailer 69 or driving out the nacelle 3 with the transport trailer 69 the barrier tape 79 at the end of the flow line 1 is open and the security trigger at the brackets is deactivated. Again, a radio controlled dead-man's control can be used to activate a security alarm by a foreman or team leader.

Figure 26:
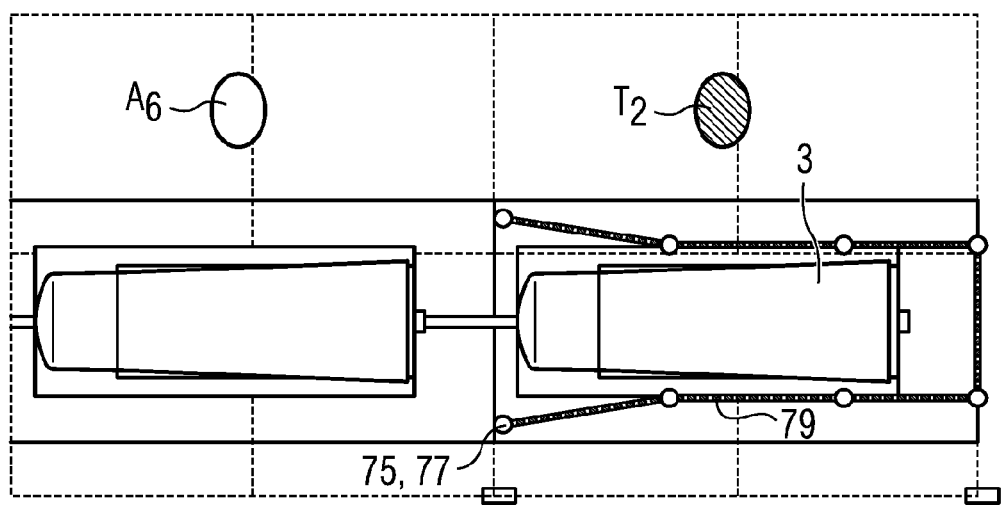

FIG. 26 illustrates the same safety system as in FIG. 25 while the assembly trailer 5 is lifted together with the nacelle 3 (cf. FIGS. 18 and 20).

The station is locked with barrier tape 79 as described before and the safety system is working. The outlet gate of the paint booth at the sixth work station $A_6$ is closed and has a security trigger with is in connection to the security system. During operation of the lifting units 59 the security trigger at the roller shutter 77 is activated. The upper and lower end position of the lifting units 59 is scanned by position switches (not shown).

The assembly of the legs 67 to the center beams 40 is only allowed when the end position of the lifting units 59 is achieved and a mechanical fall arrester is in position. The tractor is only free to pull out the empty assembly trailer 5 when the lifting units 59 are in home position. This must be verified by the safety system.

FIG. 27 illustrates a safety system for a complete flow line 1 pulling according to various embodiments of the invention.

The complete flow line 1 area is locked by a barrier tape 79 during pulling of the flow line 1. At all the work stations $A_1$, $A_2, A_3, A_4, A_5, A_6$ and at the technical stations $T_1$, $T_2$ nobody, with exception of a tractor driver inside the tractor cabin is allowed be inside the locked area. The inlet and outlet roller shutter of the paint booth at the sixth work station $A_6$ are open, as checked by a safety switch.

The tow bar 37 is connected to all the assembly trailers $5a$, $5b, 5c \ldots, 5n-1, 5n$, which is shown with a mechanical-optical indication. When the barrier tape 79 is taken out of the bracket of a roller shutter 77 an optical and acoustical alarm signal is activated automatically due to a security query and the engine of the tractor is powered off directly. The same happens if an emergency button is pressed. Such emergency stop button can be realized on middle posts 83 which also house tape retractors.

In addition, there is a radio controlled dead-man's control in operation to activate a security alarm by foreman or team leader.

Before the pulling takes place, the end of the operation time (e.g. 5 h) of a cycle is indicated in all stations by a count-down time display.

Before the end of the operation time the technical and work stations $T_1, T_2, A_1, A_2, A_3, A_4, A_5, A_6$ are prepared for pulling of the flow line 1:

Swiveling all pivot cranes and manipulators in base position

Placement of all tools in tool carriers, nacelles 3 are made clear with no cables (power, compressed air, vacuum cleaner, etc.) lying inside the nacelles 3.

All support structures respectively all kid sets are moved away from respectively out of the nacelles 3.

All platforms are moved out of the flow areas.

After this all barrier tapes 79 are closed.

At the end of the operation time in all technical or work stations $T_1$, $T_2$, $A_1$, $A_2$, $A_3$, $A_4$, $A_5$, $A_6$ a foreman or team leader gives a signal that the station is fully prepared for pulling of the flow line 1 and that nobody is inside the locked area (also not inside the nacelles 3).

In the following example, it is assumed that not a pulling means 4 as shown in FIG. 17 is used for pulling the complete flow line 1, but a tractor. The safety system has signal lights to indicate:

GREEN During assembly operation

GREEN Flashing Last 5 minutes of assembly operation, all operators has to leave the marked area and have to close all barrier tapes 79

YELLOW Work stations $A_1$, $A_2$, $A_3$, $A_4$, $A_5$, $A_6$ are prepared for pulling, which means that all operators are out of the stations and that the barrier tapes 79 are closed (brackets scanned by a security query) and the foreman or team leader pressed a button to give clearance for puling. Safety is ok and all safety requirements are fulfilled.

RED The tractor starts engine and can start pulling of the flow line 1.

RED off Red is off when the engine of the tractor is off

GREEN Green is shown when the pulling is completed and the engine of the tractor is off As indicated just before, to be operated together with the invention may, for one embodiment of the invention, a terminal tractor be used. The said terminal tractor may comprise:

a coupling to an assembly trailer 5, a gooseneck, an after-treatment of exhaust gases (Diesel or LPG)

connectors for radio controlled safety circuit to stop engine a hydraulic unit with quick-connectors to assembly trailers 5, 5*a*, 5*b*, . . . , 5*n*−2, 5*n*−1, 5*n*, if required.

For various embodiments of the invention, the assembly trailers 5, 5*a*, 5*b*, 5*n*−2, 5*n*−1, 5*n* may e.g. be assembly trailers for loads of 110 t comprising:

coupling to a tow bar at both front and end, self steering device to secure straight pulling, if required, couplings for pull rods of tractor, gooseneck connectors at both front and end, four jacking points for lifting the complete assembly trailer, height adjustable and/or swivelable supports for the bottom canopy 33 of a nacelle 3, loading adapters 49, 51 for center beams 40, openings 44 for a main cable 43, mechanical-optical indications of the status of connection (e.g. red connected/yellow disconnected)

Also for one embodiment of the invention, in order to list a complete flow line system, the system may comprise:

one stationary piston system 4 to move the complete flow line 1 by e.g. 15 meters, including a hydraulic and a control unit, one tow bar 37, crossable with wheel load of e.g. 10 t, two guidings for front and rear connections to the tow bar 37 to feed in an empty assembly trailer 5*a* in the first technical station $T_1$ at the start of the flow line 1, one pusher (for tractor or easy mover) or winch to connect an empty assembly trailer 5*a* to the tow bar 1 at the first technical station $T_1$, four moveable lifting units 59 to lift and lower the loaded assembly trailer 5 (such as each 600 kN, 500 mm stroke), one moveable hydraulic and control unit including connection to a safety system for moveable lifting units, one safety system, including a safety system (PLC or PC) in cabinet, Software for safety system, operator panels, clearance buttons (such as two for each technical or work station left and right hand), multiple emergency buttons, multiple tape barriers (posts, tape retractor and brackets) left and right side of the work stations, all brackets with security query, a tape barrier (posts, tape retractor and brackets) between the first technical station $T_1$ and the first work station $A_1$, all brackets with security query, a tape barrier (posts, tape retractor and brackets) around the second technical station $T_2$ including complete working area of tractor during pulling, all brackets with security query, safety switches to record the position of inlet and outlet roller shutters and all other doors of the paint booth, death-man's controls to stop the engine of the tractor during the pulling phase, a radio-controlled safety circuit to stop the engine of tractor, a safety circuit to stop the pulling of the stationary pulling system 4, if installed, count-down time displays to show remaining assembly operation time, for each station, signals lights (green, yellow, red) to indicate operation status of the flow line 1.

Optionally the system may also comprise:

a moveable hydraulic and control unit including a connection to a safety system to connected to lifting units of the assembly trailers 5, 5*a*, 5*b*, . . . , 5*n*−2, 5*n*−1, 5*n*, lifting units 59, installed in holes 21 to lift and lower the loaded assembly trailer 5, 5*a*, 5*b*, . . . , 5*n*−2, 5*n*−1, 5*n* (such as each 50 t, 500 mm stroke)

a hydraulic and control unit including a connection to a safety system for stationary lifting units 59.

Although the present invention has been disclosed in the form of preferred embodiments and variations thereon, it will be understood that numerous additional modifications and variations could be made thereto without departing from the scope of the invention. In particular, this applies to the shape and kind of tow bar, but also to the pulling means used to pull the whole flow line as well as the last trailer in the line and/or the completely assembled nacelles.

For the sake of clarity, it is to be understood that the use of "a" or "an" throughout this application does not exclude a plurality, and "comprising" does not exclude other steps or elements.

The invention claimed is:

1. A method of operating a flow line, the flow line comprising two or more assembly stations for the assembly of a heavy machine, the method comprising the steps of:
    installing a prepared assembly trailer in the flow line at a location upstream of or at a first assembly station,
    connecting the prepared assembly trailer to at least one flow line tow bar,
    if the prepared assembly trailer is installed upstream of said first assembly station:
        then moving the said assembly trailer to said first assembly station,
        else moving all the flow line assembly trailers to the next assembly station,
    wherein the steps of moving the flow line assembly trailers are performed timewise stepwise.

2. The method according to claim 1, wherein said connecting the prepared assembly trailer is done by activating a hydraulic pin on the tow bar which engages to a hydraulic pin receiving area on the trailer.

3. The method according to claim 1, wherein said prepared assembly trailer is prepared with suitable cables to be installed in said heavy machine.

4. The method according to claim 1, further comprising the step of removing one assembly trailer from the flow line, said removed assembly trailer being the trailer moved from the last of the assembly stations.

5. The method according to claim 1, wherein said flow line tow bar connects one assembly trailer to another trailer so as to form a serial connection between the assembly trailers.

6. The method according to claim 1, wherein said flow line tow bar is located and operated in a countersunk pit below the assembly trailers.

7. The method according to claim 1, wherein the heavy machine comprises a wind turbine nacelle.

8. An assembly trailer configured for performing the method according to claim 1.

9. A flow line for the assembly of a heavy machine with two or more assembly stations, the flow line comprising:
- a plurality of assembly trailers,
- at least one tow bar connecting at least two assembly trailers,
- a pulling device which is operable to move the assembly trailers on the flow line via the tow bar,
- wherein that if the prepared assembly trailer is installed upstream of said first assembly station with respect to movement direction of the flow line:
  - then the pulling device moves the said assembly trailer to said first assembly station,
  - else the pulling device moves all the flow line assembly trailers to the next assembly station,
- wherein the pulling device is further configured in such way that it moves the flow line assembly trailers timewise stepwise.

10. The flow line according to claim 9, wherein the heavy machine comprises a wind turbine nacelle.

11. The flow line according to claim 9, wherein the pulling device comprises a stationary piston system.

* * * * *